United States Patent
Marchant et al.

(10) Patent No.: US 11,500,477 B2
(45) Date of Patent: Nov. 15, 2022

(54) SYSTEMS AND METHODS FOR INTERACTING AND INTERFACING WITH AN ARTIFICIAL INTELLIGENCE SYSTEM

(71) Applicant: Google LLC, Mountain View, CA (US)

(72) Inventors: Robert Marchant, Richmond (GB); David Matthew Jones, London (GB); Henry John Holland, London (GB); Alexander George Hulme, Richmond (GB); Fiona Paula O'Leary, London (GB); Julie Mareva Arrive, London (GB)

(73) Assignee: GOOGLE LLC, Mountain View, CA (US)

( * ) Notice: Subject to any disclaimer, the term of this patent is extended or adjusted under 35 U.S.C. 154(b) by 973 days.

(21) Appl. No.: 16/025,632

(22) Filed: Jul. 2, 2018

(65) Prior Publication Data
US 2020/0004351 A1 Jan. 2, 2020

(51) Int. Cl.
*G06N 20/00* (2019.01)
*G06T 19/20* (2011.01)
*G06V 20/20* (2022.01)
*G06V 20/00* (2022.01)
*G06F 3/0354* (2013.01)

(52) U.S. Cl.
CPC ......... *G06F 3/03542* (2013.01); *G06N 20/00* (2019.01); *G06T 19/20* (2013.01); *G06V 20/20* (2022.01); *G06V 20/35* (2022.01)

(58) Field of Classification Search
CPC ............ G06F 3/03542; G06K 9/00671; G06K 9/00684; G06T 19/20
See application file for complete search history.

(56) References Cited

U.S. PATENT DOCUMENTS

| | | | |
|---|---|---|---|
| 7,350,938 B2* | 4/2008 | Chuang | F21V 33/008 362/240 |
| 10,210,364 B1* | 2/2019 | Feng | G02B 19/0066 |
| 10,223,744 B2* | 3/2019 | Brady | B60R 16/0231 |

(Continued)

OTHER PUBLICATIONS

Invitation to Pay Additional Fees for Application No. PCT/US2019/040279, dated Oct. 22, 2019, 16 pages.

*Primary Examiner* — Grace Q Li
(74) *Attorney, Agent, or Firm* — Dority & Manning, P.A.

(57) ABSTRACT

The present disclosure provides systems and methods that include or otherwise leverage an artificial intelligence system and/or provide user interface mechanisms particularly suited for interacting and/or interfacing with an artificial intelligence system. A computing system can include a camera, a light-emitting device, and an artificial intelligence system that comprises one or more machine-learned models. The computing system can include a processor and one or more non-transitory computer-readable media that stores instructions that, when executed, cause the processor to obtain an image of a scene captured by the camera; generate an attention output that describes at least one region of the scene that includes a subject of a processing operation performed by the artificial intelligence system; and control the light-emitting device to emit light onto or adjacent a region of the scene that includes the subject of the processing operation performed by the artificial intelligence system.

19 Claims, 16 Drawing Sheets

(56) References Cited

U.S. PATENT DOCUMENTS

| | | | |
|---|---|---|---|
| 2015/0130406 A1* | 5/2015 | Jing | H02J 7/0042 |
| | | | 320/108 |
| 2016/0239982 A1 | 8/2016 | Li et al. | |
| 2017/0344645 A1* | 11/2017 | Appel | H04W 4/21 |
| 2018/0114329 A1 | 4/2018 | Wexler et al. | |
| 2018/0262545 A1* | 9/2018 | Alexander | F21L 4/005 |
| 2019/0366554 A1* | 12/2019 | Breugelmans | B25J 9/163 |
| 2021/0055911 A1* | 2/2021 | Tracz | G06F 3/023 |
| 2021/0182558 A1* | 6/2021 | Kim | G06K 9/00671 |

* cited by examiner

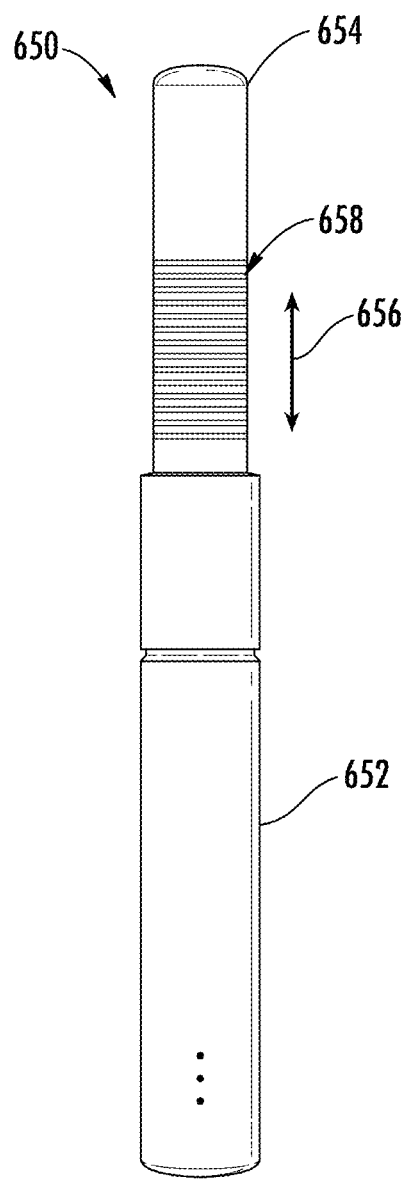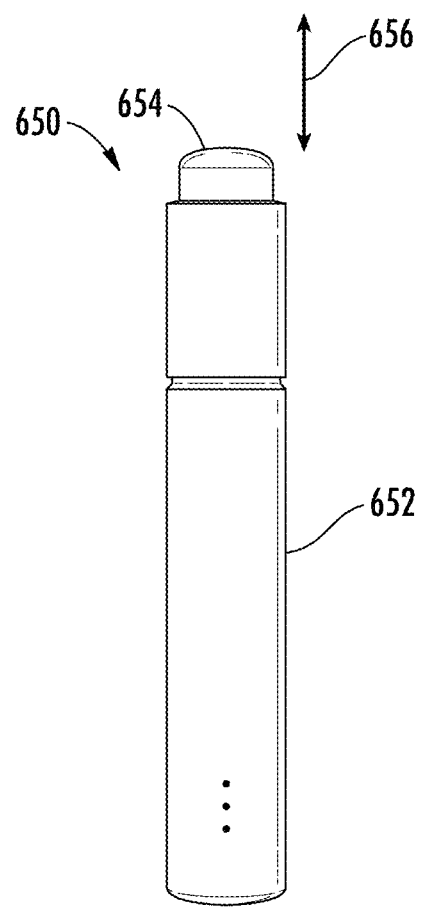
FIG. 6C
FIG. 6D

SYSTEMS AND METHODS FOR INTERACTING AND INTERFACING WITH AN ARTIFICIAL INTELLIGENCE SYSTEM

FIELD

The present disclosure relates generally to computing devices including artificial intelligence systems and/or machine-learned models. More particularly, the present disclosure relates to systems and methods particularly suited for interacting and/or interfacing with an artificial intelligence system.

BACKGROUND

Handheld or otherwise portable devices that include or otherwise leverage artificial intelligence systems have many applications. Examples include performing operations associated with a "personal assistant," such as answering questions posed by a user of the device, anticipating questions posed by the user, providing suggestions to the user, and the like. Conventional form factors for such devices, however, lack mechanisms for the artificial intelligence system to interact with the physical world and/or communicate information to the user in an efficient or intuitively understandable way. Additionally, such devices can undesirably collect data (e.g., audio or visual information) at times when the user may prefer that the device not do so. Such data collection can undermine the user's confidence or trust in the device and reduce the usability or effectiveness of the device.

SUMMARY

Aspects and advantages of embodiments of the present disclosure will be set forth in part in the following description, or can be learned from the description, or can be learned through practice of the embodiments.

One example aspect of the present disclosure is directed to computing system that includes a camera; a light-emitting device; an artificial intelligence system that comprises one or more machine-learned models; one or more processors; and one or more non-transitory computer-readable media that collectively store instructions that when executed by the one or more processors cause the computing system to: obtain an image of a scene captured by the camera; generate an attention output that describes at least one region of the scene that includes a subject of a processing operation performed by the artificial intelligence system; and control the light-emitting device to emit light onto or adjacent the at least one region of the scene that includes the subject of the processing operation performed by the artificial intelligence system.

Another example aspect of the present disclosure is directed to a hand-held computing device. The device has an elongated, cylindrical body having a first end and a second end that is opposite the first end along a longitudinal axis of the body. The device has a display screen positioned at the first end of the body. The device has one or more processors and one or more non-transitory computer-readable media that collectively store instructions that when executed by the one or more processors cause the hand-held computing device to: receive data descriptive of a virtual object, wherein the virtual object has a virtual location in three-dimensional space; display a portion of the virtual object on the display screen, wherein the portion of the virtual object displayed on the display screen has a virtual location that is along a projection of the longitudinal axis from the second end of the body at a current pose of the body; and, in response to movement of the body from the current pose to a new pose, update the display screen such that the display screen displays a new portion of the virtual object that has a virtual location that is along the projection of the longitudinal axis from the second end at the new pose of the body.

Another example aspect of the present disclosure is directed to a computing system that includes an elongated, cylindrical body having an end; a screen disposed adjacent the end; a machine-learned model configured to produce an output and a confidence value associated with the output; one or more processors; and one or more non-transitory computer-readable media that collectively store instructions that when executed by the one or more processors cause the computing system to display a confidence graphic on the screen that graphically describes the confidence value associated with the output of the machine-learned model.

Another example aspect of the present disclosure is directed to a computing system that includes: a machine-learned model configured to receive an input; one or more processors; and one or more non-transitory computer-readable media that collectively store instructions that when executed by the one or more processors cause the computing system to: selectively collect information about a surrounding environment; input at least a portion of the collected information into the machine-learned model as the input; selectively switch from one of a plurality of data collection modes to another of the plurality of data collection modes, the data collection modes including a permissible collection mode and a prohibited collection mode, wherein in the permissible collection mode, the computing system is permitted to collect information from the surrounding environment, and wherein in the prohibited collection mode, the computing system is prohibited from collecting information from the surrounding environment; and provide an indication of a current data collection mode of the computing system, the current data collection mode being selected from the plurality of data collection modes.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which: Example drawings are attached. A brief description of the drawings is provided below:

FIGS. 6C and 6D depict an example computing system providing an indication of two different data collection modes.

Figure 1A:
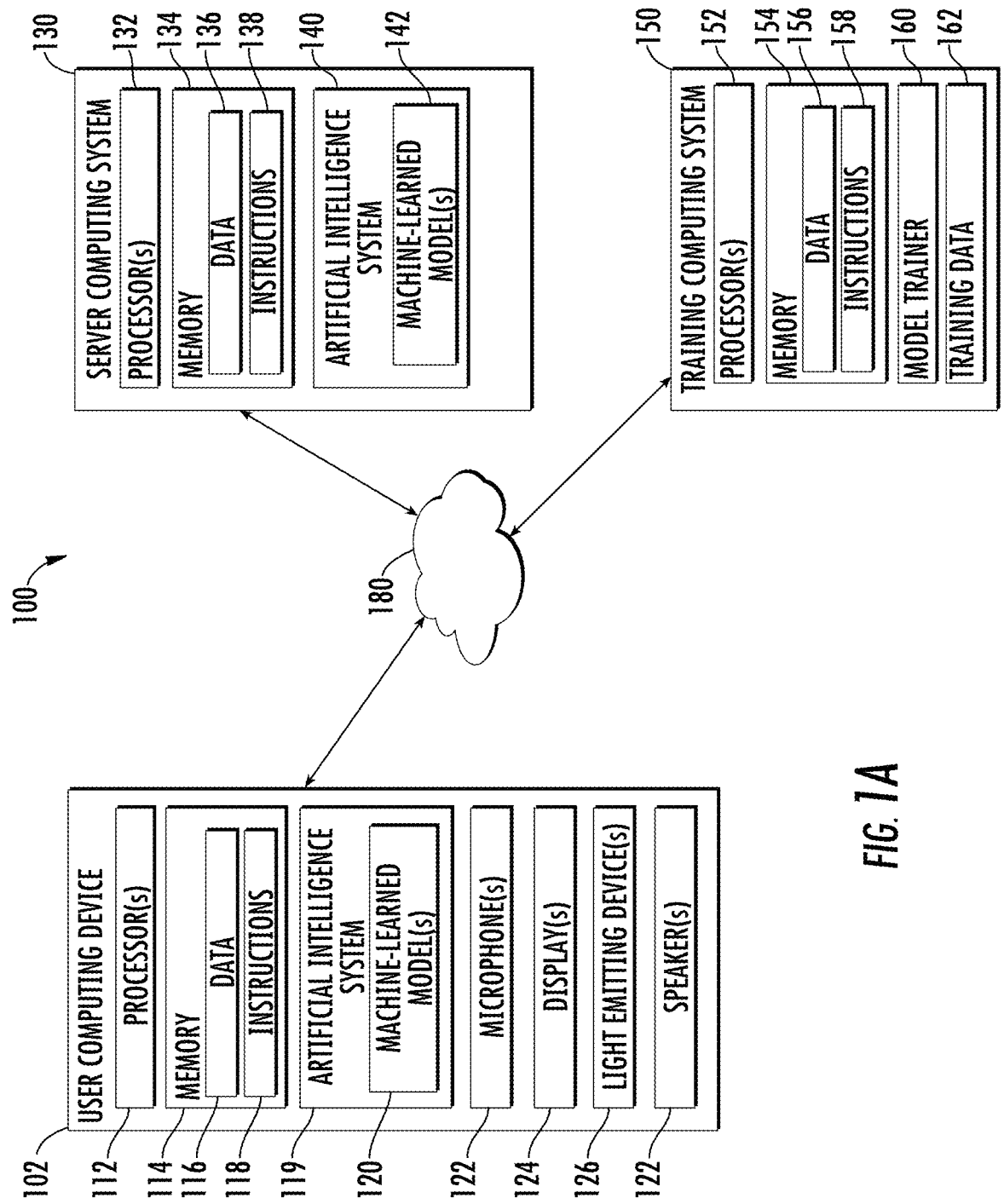
FIG. 1A depicts a block diagram of an example computing system that provides user interface mechanisms for interacting and/or interfacing with an artificial intelligence system according to example embodiments of the present disclosure.

Reference numerals that are repeated across plural figures are intended to identify the same features in various implementations.

DETAILED DESCRIPTION

Overview

Example aspects of the present disclosure are directed to computing systems and hand held devices that include or otherwise leverage an artificial intelligence system and/or are configured to provide user interface mechanisms that would be particularly suited for interacting and/or interfacing with an artificial intelligence system. In particular, aspects of the present disclosure are directed to a hand-held device that has the form factor of a writing pen or stylus and which includes an on-device artificial intelligence system that leverages various features of the device to intelligently interact with the user and/or other aspects of the physical environment. For example, in some implementations, the artificial intelligence system can include one or more machine-learned models and can be configured to serve as a "personal assistant," such as by answering questions, providing suggestions, or other actions which may, for example, be based on a contextual understanding of the user's current environment and/or desires. To facilitate the various features described herein, the device can collect information about its current environment, such as audio and video recordings. Importantly, the user can be provided with controls allowing the user to make an election as to both if and when the device, programs, or features described herein may enable collection of user information (e.g., audio recordings, video, images). In addition, certain data may be treated in one or more ways before it is stored or used, so that personally identifiable information is removed. For example, a user's identity may be treated so that no personally identifiable information can be determined for the user. Thus, the user may have control over what information is collected about the user, how that information is used, and what information is provided to the user.

As one example feature that enables intelligent interaction with the user and other humans, in some implementations, the device can include and control a light-emitting device to indicate a "gaze" of the artificial intelligence system in the real world. For example, the device can use the light-emitting device as a pointer to draw the user's attention to a particular object. Alternatively or additionally, the user can manipulate the orientation of the light-emitting device to select a certain object to bring to the attention of the artificial intelligence system.

More particularly, in some implementations, a computing device (e.g., hand-held device) can include a camera (e.g., wide angle or wide field of view camera), a light-emitting device, such as a laser emitter or projector, for example, and an artificial intelligence system, as described. The computing device can obtain an image of a scene captured by the camera and can generate an attention output that describes at least one region of the scene that includes a subject of a processing operation performed by the artificial intelligence system. For example, the subject of the processing operation can be an object being recognized, analyzed, or that is associated with an output of the artificial intelligence system, such as an answer to a question posed by the user or the response to a command issued by the user. The device can control the light-emitting device to emit light onto or adjacent at least one region of the scene that includes the subject of the processing operation performed by the artificial intelligence system.

The light emitted onto or adjacent the scene can indicate the subject of the artificial intelligence system's "focus" or "attention" to a user of the computing device. The user is thus provided with feedback as to the focus of the system. If the focus of the system is not the focus required by the user, using the feedback provided by the light emitted onto or adjacent the scene the user can manipulate the device such as to cause it to provide the focus as required by the user, e.g. by the user orienting the device so the focus required by the user is more central and/or larger in a field of view of a camera of the device. Additionally, the emitted light can also indicate a result or output of the artificial intelligence system. For example, the artificial intelligence system can be configured to select a region of the scene in response to a query presented by the user of the computing device. For instance, the user can present a question or command about the scene to the computing device (e.g., by speaking a question), and the artificial intelligence system can produce an attention output that answers or attempts to answer the user's question or command.

As an example, the user can direct the camera of the computing device to a group of objects. The artificial intelligence system can produce an attention output associated with at least one of the objects, and the computing device can control the emitted light onto or adjacent a region of the scene such that the emitted light indicates the status of the artificial intelligence system's analysis or recognition with respect to at least one of the objects. As another example, the user can ask a question about which object (or objects) within the scene satisfy a criteria, and the computing device can emit light in a manner that indicates at least one object that the artificial intelligence system has selected in response to the question.

As another example, the user can direct the camera of the computing device towards a surface having writings or marking on the surface. The artificial intelligence system can emit light on to the surface in a manner that shows that the artificial intelligence system has recognized and/or interpreted the writings or markings. For instance, the emitted light could outline, underline, or otherwise identify one or more of the writing or markings, which could indicate an answer to a question about the writings or markings.

In some implementations, the artificial intelligence system can include a machine-learned selection model configured to receive the image of the scene and, in response, provide the attention output that describes the at least one region of the scene that includes the subject. The machine-learned selection model can include an object recognition model and the region of the scene can include at least one object recognized by the object recognition model. As an example, the object recognition model can be trained to recognize objects depicted in the image and output information identifying the objects and their respective locations in the image. The artificial intelligence system can select one or more of the objects to produce the attention output (e.g., in response to a question or command from the user). Other types or forms of computer vision can be used in addition or alternatively to the object recognition model.

In some implementations, the computing device can include an elongated, cylindrical body that houses the camera, light-emitting device, artificial intelligence system, one or more processors, and/or memory. As an example, the elongated, cylindrical body can be roughly the size of a pen or stylus such that the computing device can be easily held in a hand of the user. In other implementations, the computing device can include a body having any suitable size and shape that is easily held in the hand of the user.

In some implementations, the camera can be disposed adjacent a first end of the elongated, cylindrical body. The user can orient the elongated, cylindrical body as desired to point the camera. Such a configuration can allow the user to easily direct the "attention" of the artificial intelligence system as the user desires. In some embodiments, the light-emitting device can be disposed adjacent the camera at the first end of the elongated, cylindrical body. As an example, the camera can include an outermost lens or cover, and the light-emitting device can be disposed behind the outermost lens or cover such that the light-emitting device is not visible to the user from the exterior of the elongated cylindrical body.

In some implementations, the computing device can be configured to adjust a direction of emission of the light relative to the computing device such that, when the computing device (and therefore the light-emitting device) is moved relative to the scene, the light continues to be emitted onto or adjacent the at least one region of the scene that includes the subject. As an example, the user can adjust the position of the computing device relative to the scene, for example, to better view a display screen of the computing device. Despite the movement of the computing device (including the light emitting device), the computing device can adjust the direction of the light emission such that the light continues to indicate the subject of the operation performed by the artificial intelligence system.

In further examples, the user can position the computing device such that the camera of the computing device has the user's face within its field of view. The user can speak (e.g., out loud or silently, moving lips only) and the artificial intelligence system can perform lip-reading or other forms of speech processing (e.g., audio processing in combination with the captured imagery of the lips) to determine what the user has said. In another example, the computing device can perform face or biometric authentication to enable the user to perform or access certain actions or data. In yet further examples, the computing device can include a RADAR system to identify gestures performed adjacent to but without touching the device. The device can also include touch interfaces at various locations, including, for example, at an end of the body.

According to another aspect of the present disclosure, in some implementations, the computing device can be part of a larger system that includes a docking device. The docking device and the computing device can be configured to wirelessly communicate with each other. The docking device can be configured to be coupled with the body of the computing device. As an example, the docking device can be configured to receive or otherwise attach or connect to the body.

In some implementations, magnetic connections are used to physically hold the body to the docking device. For example, in some implementations, only magnetic connections are used so that the body easily snaps in and out of connection with the docking device. In some implementations, the docking device can fold around the body of the computing device.

In some implementations, the docking device can include a display screen. The docking device can be configured to display an output of the artificial intelligence system on the display screen of the docking device. The docking device can be configured such that, when the body of the computing device is coupled with the docking device, the display screen of the docking device is positioned proximate the display screen of the body of the computing device. The computing device can be configured to produce a display on both the display screen of the body and the display screen of the docking device in an extended display manner. For example, a display object or image can be displayed across both screens such that the display screen of the docking device acts as an extended display area of the screen on the body of the computing device.

In some implementations, the display screen of the body can provide a condensed visual or graphical interface, and when the body is connected to the docking device, the computing device can automatically switch display modes such that the display screen of the docking device displays an uncondensed visual or graphical interface. Thus, the docking device can provide additional screen real estate that enables deeper interactions. Furthermore, in implementations in which the docking device can fold around the body of the computing device, a flexible display can be used so that the display also folds around the body of the computing device, thereby creating a multi-sided display.

In other implementations, in addition or alternatively to the docking device, the computing device can extend or project display information onto other display screens (e.g., including screens to which the device is not physically connected). Thus, the computing device can push experiences to partner screens for richer information. The computing device can also select and control other devices in the world (e.g., Internet of Things devices), if enabled to do so.

As another example feature that enables intelligent interaction with the user, in some implementations, the computing device can provide a key hole interface. The key hole interface can provide a quick window into a virtual or digital object or experience.

More particularly, in some implementations, a hand-held computing device can include a relatively small display screen (e.g., positioned at the end of an elongated, cylindrical body). The hand-held computing device can receive data descriptive of a virtual object that has a virtual location in three-dimensional space. The hand-held computing device can display a portion of the virtual object on the display screen. The portion of the virtual object displayed on the display screen can have a virtual location that is along a projection of the longitudinal axis from the second end of the body at a current pose of the body. In response to movement of the body from the current pose to the new pose, the device can update the display screen such that the display screen displays a new portion of the virtual object that has a virtual location that is along the projection of the longitudinal axis from the second end at the new pose of the body.

Thus, the computing device may provide the user with a small window or "key hole" into a virtual environment that is larger than the display screen. The computing device may create the illusion that the virtual object is remaining stationary at the virtual location when the computing device and display screen are moved. The user can then move the computing device to display different portions of the virtual object as the user desires.

Using this feature, the user can quickly and efficiently view the contents of a virtual object that is relatively large compared with the display screen. For example, the elongated, cylindrical body of the hand-held computing device can be roughly the size of a pen or stylus such that the computing device can be easily held in a hand of the user. The display screen can be disposed at the first end of the body and housed within the elongated, cylindrical body. For instance, the display screen can have an outer lens or cover that faces outward along the longitudinal axis of the body at the first end of the elongated, cylindrical body. The display screen can generally be smaller than the body. For example, a ratio of a length of the body to a diameter of the display screen can range from 3 to 30, in some embodiments from 4 to 20, in some embodiments from 5 to 10.

This configuration can also allow the user to privately or semi-privately view the virtual object in a public location. The small size of the display can inhibit or prevent bystanders from easily viewing the virtual object.

The virtual object can include a variety of suitable objects. As an example, the virtual object can include text, such as a line of text. The virtual object can also comprise an image, 3-D object, and/or environment. The virtual object can include any visual information for display to the user.

As another example feature that enables intelligent interaction with the user, in some implementations, the computing device can provide signals (e.g., display signals) that indicate a confidence of the artificial intelligence system in its decisions, understanding, or other outputs. For example, the computing device can include a machine-learned model configured to produce an output and a confidence value associated with the output. The computing device can display a confidence graphic on its display screen that graphically describes the confidence associated with the output of the machine-learned model.

The confidence graphic can communicate the confidence of the artificial intelligence system with respect to a present operation or task in a manner that is easily interpreted and/or understood by the user. As examples, the confidence graphic can include a shape density, a color combination, and/or a shape movement characteristic that describes the confidence output by the machine-learned model. As the machine-learned model performs an analysis, the confidence graphic can change to reflect a changing confidence level associated with the output. For example, the confidence level of the artificial intelligence system can increase as the machine-learned model converges on a likely answer or solution to the question or analysis being performed. The hand-held computing device can update the display of the confidence graphic to convey this change in status to the user. Other confidence signals can be used as well such as vibratory signals (e.g., frequency of vibration indicative of confidence), audio signals (e.g., pitch indicative of confidence), and/or other signals, in addition or alternatively to confidence, the device can also use different signals or graphics to indicate varying levels of urgency.

The use of confidence signals such as confidence graphics can improve the effectiveness of the artificial intelligence system. For example, the user can be able to easily evaluate the reliability of an output of the artificial intelligence system. The user can also be able to quickly assess whether the artificial intelligence system is converging on an answer or solution to a question. This may permit the user to estimate a remaining time until the artificial intelligence system has drawn a reliable conclusion. The user may also be able to deduce from the confidence graphic when the artificial intelligence system is not likely to converge on an answer or solution in a reasonable time period. The user can then re-phrase the question, pose a different question, assign a new task to the artificial intelligence system, troubleshoot the problem, or the like.

According to another aspect of the present disclosure, the user can be able to control data collection by the computing device in an easy and intuitive manner. The device may also learn to automatically switch its data collection modes based on context or other information. More particularly, the computing device can selectively collect information about a surrounding environment (e.g., recording audio or capturing images/video) and can input at least a portion of the collected information into one or more machine-learned models. The device can selectively switch from one of a plurality of data collection modes to another of the plurality of data collection modes. The data collection modes can include a permissible collection mode and a prohibited collection mode. In the permissible collection mode, the computing device can be permitted to collect information from the surrounding environment. In the prohibited collection mode, the computing device can be prohibited from collecting information from the surrounding environment. The computing device can provide an indication of its current data collection mode to the user.

The user may be able to instruct the computing device to switch between modes, such as by voice command or other input. For instance, the user can instruct the computing device to switch to the prohibited collection mode when the user would prefer that the computing device refrain from collecting data. In some implementations, placing the device into prohibited collection mode does not necessarily include blocking or otherwise inhibiting the data collection components of the device (e.g., camera), but instead controls the processing capability of the device such that data is not actively collected and stored by the device. The computing device can indicate its current status to the user such that the user (and potentially other surrounding individuals) can quickly verify that the computing device has switched to the prohibited collection mode as instructed. Providing the indication of the current data collection mode can increase the user's confidence in his control over when the computing device collects data (e.g., records audio or captures visual information) and when the computing device is not permitted to do so. These features may make the user may be more comfortable with and/or trusting of the computing device, making it more effective, for example at performing personal assistant tasks.

The computing device can be configured to provide the indication of the current data collection mode in a variety of ways. As an example, the computer system can display a graphic that describes or is indicative of the current data collection mode of the computing device. Each data collection mode can have an associated graphic, such that the user of the computing device can identify the current data collection mode based on the displayed graphic. As another example, the computing device can be configured to deactivate the screen such that the screen is free of a graphical display to indicate the current data collection mode. For instance, deactivating the screen can indicate that the computing device is in the prohibited collection mode, such that the user knows that the computing device is not collecting information.

As another example feature that enables intelligent interaction with the user and other humans, in some implementations, the computing device can include one or more physically manipulable components that enable the user to easily alter the outward appearance of the device. As one example, the device can include a first portion that can be selectively placed over or removed to reveal a second portion of the device, thereby acting as a "hood." As another example, the second portion of the device can be insertable within the first portion so that the second portion is no longer outwardly visible. These and other similar interactions with the device can provide clear social signals to other persons in the vicinity of the device. Thus, the user can quickly disconnect the artificial intelligence system from sensors and can show others that they have done so.

More particularly, in some implementations, the computing device can be switched between modes by physically manipulating an aspect of a body of the computing device. As an example, the computing device can include a body having an elongated, cylindrical shape. The body can include a first portion and a second portion, which can be moveable relative to the first portion. The computing device can be configured to detect movement of the second portion relative to the first portion and switch from one of the plurality of data collection modes to another of the plurality of data collection modes based on detecting such movement. For example, the second portion can be configured to translate or slide along a longitudinal axis of the elongated, cylindrical body relative to the first portion. As another example, the second portion can be configured to rotate (e.g., about the longitudinal axis) relative to the first portion. As a further example, the second portion may include a button that is pressed to switch the computing device between modes.

In some implementations, movement of the second portion relative to the first portion can cause a region of the cylindrical body to be either displayed or become obscured. The region of the cylindrical body that is displayed or obscured can be indicative of the current data collection mode of the computing device. As an example, the second portion may be slidable away from the first portion along the longitudinal axis of the elongate, cylindrical body to reveal a previously obscured region of the first portion. The previously obscured region can have a different appearance (e.g., be differently colored, patterned, textured, or illuminated) than surrounding regions of the first portion of the body. This may provide a clear visual indication to the user of the current data collection mode of the computing device.

As another example, the second portion can be retractable within the first portion. The second portion can be generally cylindrical and include a display screen disposed on at least a portion of an outer circumferential surface. When the second portion is retracted at least partially within the first portion, some or all of the second portion can be obscured from view by the first portion. For instance, the portion that is obscured can include some or all the display screen.

These features can provide the user with a clear visual cue and/or tactile feedback about when the computing device is permitted to collect information. The user can more easily instruct the computing device to switch between modes and verify that the switch has been completed as instructed. The user can also easily communicate to others nearby that the computing device is not listening or recording. This communication ability may improve the usability and efficiency of the computing device, for example, for performing tasks associated with a "personal assistant." The computing device can be configured to perform any suitable task, however, not limited to those generally associated with a personal assistant.

As one example, aspects of the systems and methods of the present disclosure can be included or otherwise employed within the context of an application, a browser plug-in, or in other contexts. Thus, in some implementations, the models of the present disclosure can be included in or otherwise stored and implemented by a user computing device such as hand-held computing device. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 100 that provides user interface mechanisms for interacting and/or interfacing with an artificial intelligence system according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In exemplary embodiments, the user computing device 102 is a hand-held device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include an artificial intelligence system 119 that can include one or more machine-learned models 120. For example, the machine-learned models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Other machine-learned models can be used as well. Example artificial intelligence systems 119 are discussed with reference to FIGS. 2A through 2C.

In some implementations, the one or more artificial intelligence systems 119 or models 120 used thereby can be received from the server computing system 130 over network 180, stored in the user computing device memory 114, and the used or otherwise implemented by the one or more processors 112. In some implementations, the user computing device 102 can implement multiple parallel instances of a single artificial intelligence system 119 (e.g., to perform parallel operations across multiple instances of the artificial intelligence systems 119).

More particularly, the artificial intelligence system 119 may be configured to leverage various features (e.g., display screens, light-emitting devices, and/or physical attributes) of the user computing device 102 to intelligently interact with the user and/or other aspects of the physical environment. For example, the user computing device 102 can include and control a light-emitting device to indicate a "gaze" of the artificial intelligence system 119 in the real world. As another example, the user computing device 102 can provide a key hole interface using the display 124. The key hole interface can provide a quick window into a virtual or digital object or experience. As a further example, the user computing device 102 can provide signals (e.g., on the display 124) that indicate a confidence of the artificial intelligence system 119 in its decisions, understanding, or other outputs. As a yet further example, the user computing device 102 can be configured to selectively switch from one of a plurality of data collection modes to another of the plurality of data collection modes (e.g., a prohibited data collection in which the artificial intelligence system 119 is prohibited from collecting data about the environment of the user computing device 102). The user computing device 102 may provide an indication of its current data collection mode. For instance, the user computing device 102 can provide such an indication using the display 124 and/or by selectively displaying or obscuring a portion of a body of the computing device 102. These and other similar interactions with the device can provide clear social signals to other persons in the vicinity of the device. For example, the user can quickly disconnect the artificial intelligence system 119 from sensors and can show others that they have done so.

Additionally or alternatively, one or more artificial intelligence systems 140 and/or machine-learned models 142 can be included in or otherwise stored and implemented by the server computing system 130 that communicates with the user computing device 102 according to a client-server relationship. For example, the artificial intelligence systems 140 and/or machine-learned models 142 can be implemented by the server computing system 140 as a portion of a web service. Thus, one or more artificial intelligence systems 119 and/or one or more models 120 can be stored and implemented at the user computing device 102 and/or one or more artificial intelligence systems 140 and/or one or more models 142 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more artificial intelligence systems 140 and/or machine-learned models 142. For example, the models 142 can be or can otherwise include various machine-learned models such as neural networks (e.g., deep recurrent neural networks) or other multi-layer non-linear models. Example models 142 are discussed with reference to FIGS. 2A through 2C.

The server computing system 130 can train the models 142 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 142 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. The model trainer 160 can perform supervised training or unsupervised training.

In particular, the model trainer 160 can train one or more machine-learned models 142 of an artificial intelligence system 140 based on a set of training data 162. In some implementations, the artificial intelligence system 140 can be configured to serve as a "personal assistant," such as by answering questions, providing suggestions, or other actions which may, for example, be based on a contextual understanding of the user's current environment and/or desires. As such, the machine-learned models 142 may be trained using training data 162 that includes information about the user's interactions with computing devices and/or desired responses to those interactions.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model. For example, the artificial intelligence system 119 can adapt or learn based on the user's preferences, past requests, past instructions, feedback, and/or the like.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data. For example, the artificial intelligence system 119 can adapt or learn based on the user's preferences, past requests, past instructions, feedback, and/or the like. Feedback can be mined in real-time. Thus, training and/or inference can be performed on device or in the cloud.

Figure 1B:
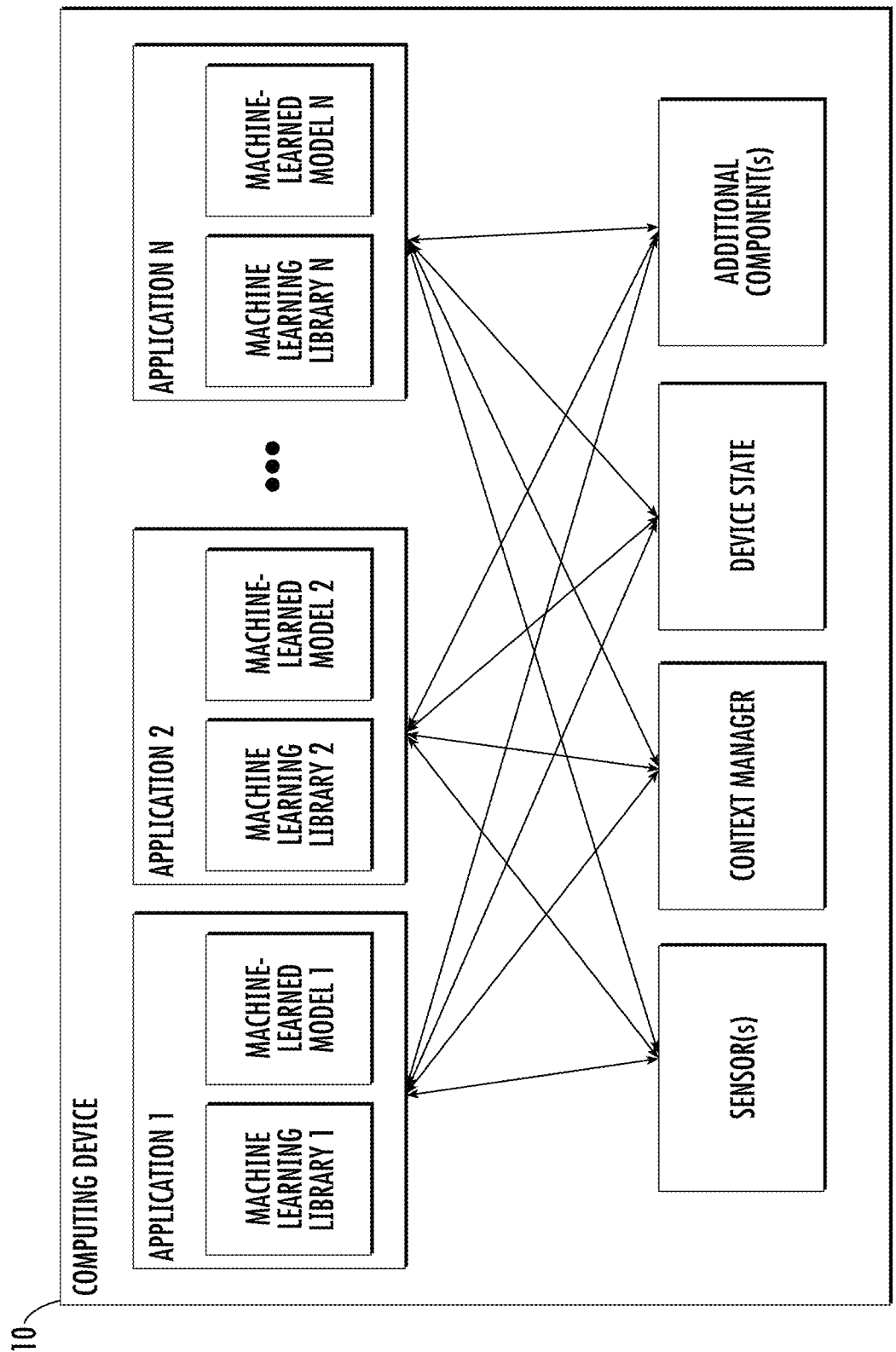
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
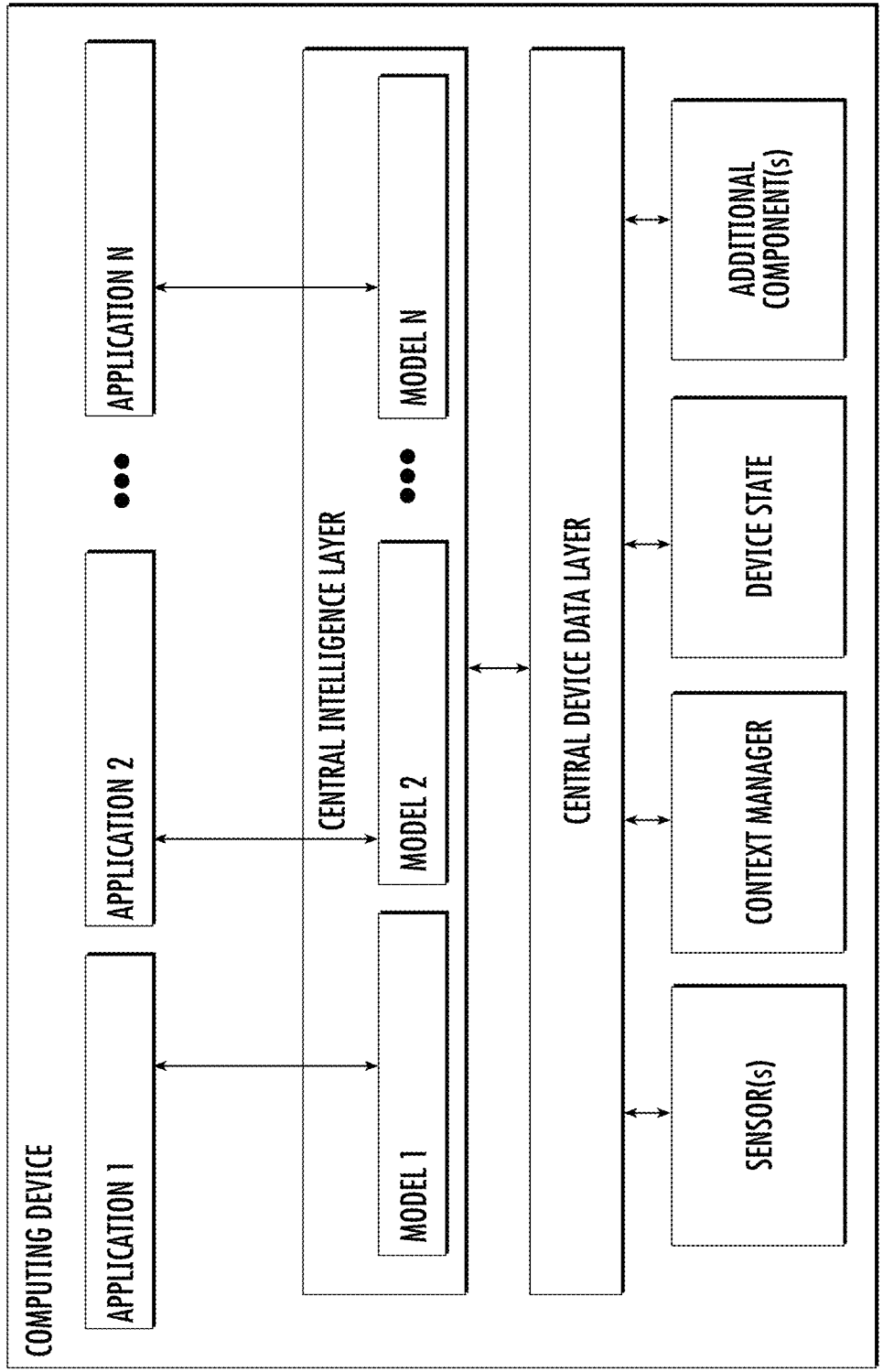
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2A:
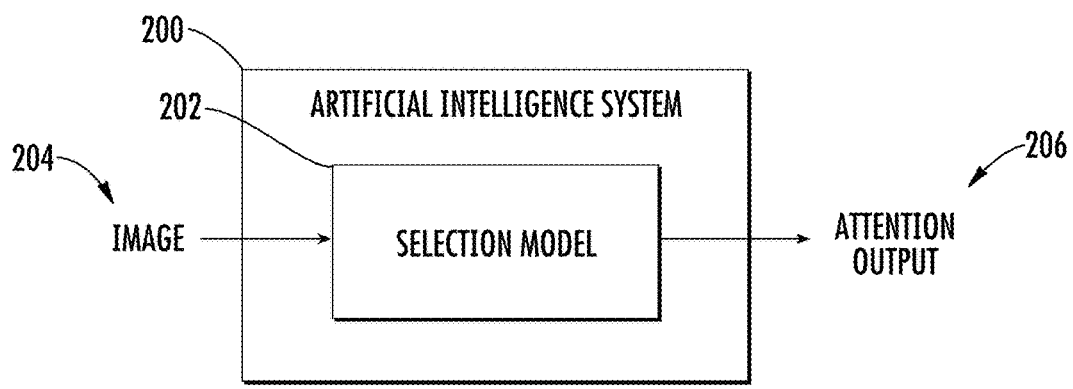
FIG. 2A depicts a block diagram of a simplified example artificial intelligence system according to example embodiments of the present disclosure.

FIG. 2A depicts a block diagram of an example artificial intelligence system 200 according to example embodiments of the present disclosure. In some implementations, the computing system may be configured to control a light-emitting device to indicate a "gaze" of the artificial intelligence system 200 in the real world. For example, the device can use the light-emitting device as a pointer to draw the user's attention to a particular object. Alternatively or additionally, the user can manipulate the orientation of the light-emitting device to select a certain object to bring to the attention of the artificial intelligence system.

More specifically, the artificial intelligence system 200 may be configured to select, categorize, analyze, or otherwise perform a processing operation with respect to an image 204 of a scene. For example, the artificial intelligence system 200 may include a selection model 202 that is trained to receive an image 204 of a scene and, in response, provide an attention output 206 that describes at least one region of the scene that includes a subject of the processing operation performed by the artificial intelligence system 200. The computing system may be configured to control the light-emitting device to emit light onto or adjacent the at least one region of the scene based on the attention output 206, for example as explained below with reference to FIGS. 4A and 4B.

Figure 2B:
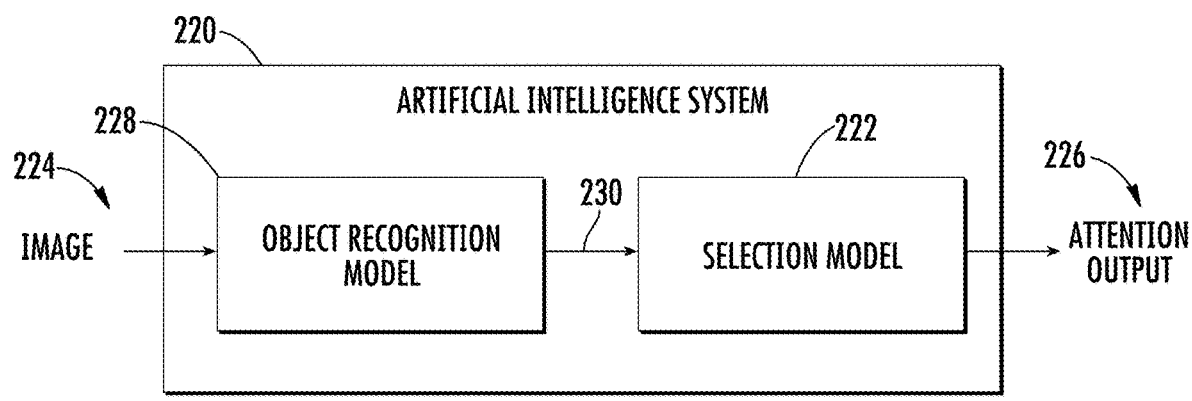
FIG. 2B depicts a block diagram of a simplified example artificial intelligence system according to example embodiments of the present disclosure.

FIG. 2B depicts a block diagram of another example artificial intelligence system 220 according to example embodiments of the present disclosure. The artificial intelligence system 220 is similar to the artificial intelligence system 200 of FIG. 2A except that the artificial intelligence system 220 further includes an object recognition model 228. The object recognition model 228 may be configured to receive an image 224 of a scene and, in response, provide a recognition output 230 that describes a region of the image 224. For example, the recognition output 230 may describe a category, a label, a characteristic, and/or a location within the image 224 associated with the image 224. The selection model may be configured to receive the recognition output 230 and, in response, provide an attention output 226 that describes at least one region of the scene that includes a subject of the processing operation performed by the artificial intelligence system 200. For example, the attention output 226 can describe the location of a region of the image 224 in response to a question or command from the user. Alternatively, the attention output 226 can describe a region of the image 224 that the selection model 222 has determined as important, relevant, or responsive to a question/command posed by the user or an anticipated desire of the user. The computing system may be configured to control the light-emitting device to emit light onto or adjacent the region(s) of the scene described by the attention output 226, for example as explained below with reference to FIGS. 4A and 4B.

Figure 2C:
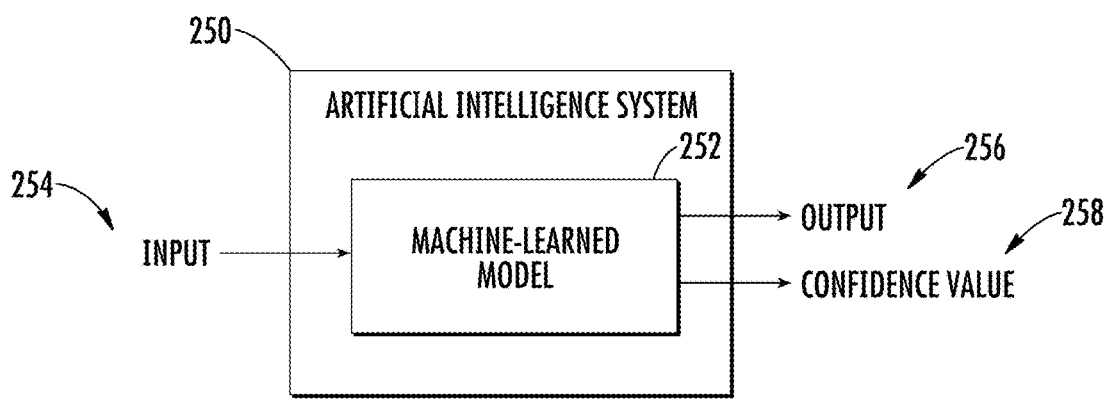
FIG. 2C depicts a block diagram of a simplified example artificial intelligence system according to example embodiments of the present disclosure.

FIG. 2C depicts a block diagram of another example artificial intelligence system 250 according to example embodiments of the present disclosure. The artificial intelligence system 250 may include a machine-learned model 252 that is configured to receive an input 254, and in response to receiving the input 254 generate an output 256 and a confidence value 258 associated with the output 256. The machine-learned model 252 may be any suitable type of model. Similarly, the input 254 and output 256 may be any type of information associated with the functions of the computing device, including "personal assistant" functions, for example.

The confidence value 258 may describe a confidence level associated with the output 256 generated by the machine-learned model 252. As an example, the confidence value 258 may describe a degree of convergence on a solution to a question posed by the user. As another example, the output 256 may be selected from a set of candidate solutions, and the confidence value 258 may describe a relative confidence (e.g., a probability, a weight, etc.) associated with the output 256 as compared with the remainder of the set of candidate solutions.

In some implementations, the computing system may display a confidence graphic that graphically describes the confidence value associated with the output of the machine-learned model. As examples, the confidence graphic may include at least one of a shape density, a color combination, or a shape movement characteristic that describes the confidence value output by the machine-learned model. Aspects of displaying the confidence graphic are described in greater detail below with reference to FIGS. 5A and 5B.

Figure 3:
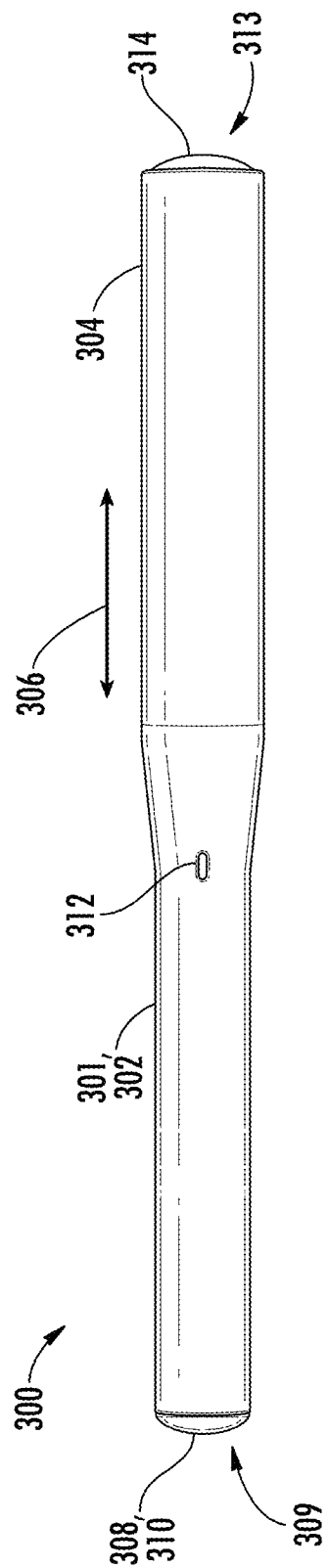
FIG. 3 depicts an example computing system having an elongated, cylindrical body according to example embodiments of the present disclosure.

FIG. 3 depicts an example computing device 300 having an elongated, cylindrical body 301 according to example embodiments of the present disclosure. As an example, the elongated, cylindrical body 301 can be roughly the size of a pen or stylus such that the computing device 300 can be easily held in a hand of the user. The elongated, cylindrical body 301 can include two cylindrical portions of different diameters that are connected together by a tapered portion. The tapered portion can be frustoconical in shape, with diameters at its ends equal to the respective diameters of the cylindrical portions. The tapered portion may be located approximately centrally along the length of the cylindrical body 301. More than half of the length of the body 301 can be cylindrical. In other implementations, however, the body 301 of the computing device 300 can have any suitable size and shape.

The elongated, cylindrical body 301 can include various devices, portions, and/or features configured to collect or transmit information to user of the device 300. For example, the body 301 may include a first portion 302 and a second portion 304 that is moveable (illustrated by arrow 306) relative to the first portion 302. The computing device 300 can be configured to detect movement of the second portion 304 relative to the first portion 302 and perform various operations based on detecting such movement. For example, the computing device 300 may be configured to switch between data collection modes, for example, as described with reference to FIGS. 6A through 6D and FIG. 14. The computing device 300 can also include a camera 308 (e.g., wide angle or wide field of view camera) disposed adjacent a first end 309 of the elongated, cylindrical body 301. A light-emitting device 310, such as a laser emitter or projector, may be disposed adjacent the camera 308. As an example, the camera 308 can include an outermost lens or cover, and the light-emitting device 310 can be disposed behind the outermost lens or cover such that the light-emitting device 310 is not visible to the user from the exterior of the elongated cylindrical body 301. The computing device may also include a microphone 312 and/or a speaker. A display 314 may be disposed adjacent a second end 313 of the body 301.

Figure 4A:
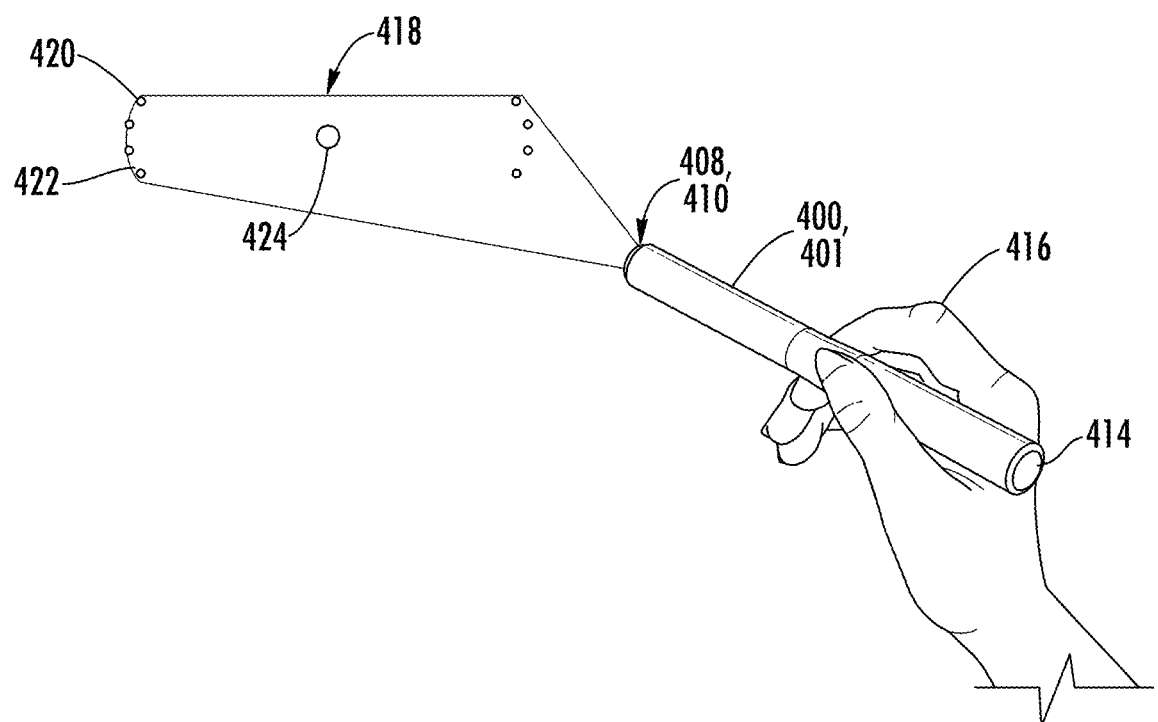
FIG. 4A depicts a hand of a user holding an example computing system emitting light according to example embodiments of the present disclosure.
Figure 4B:
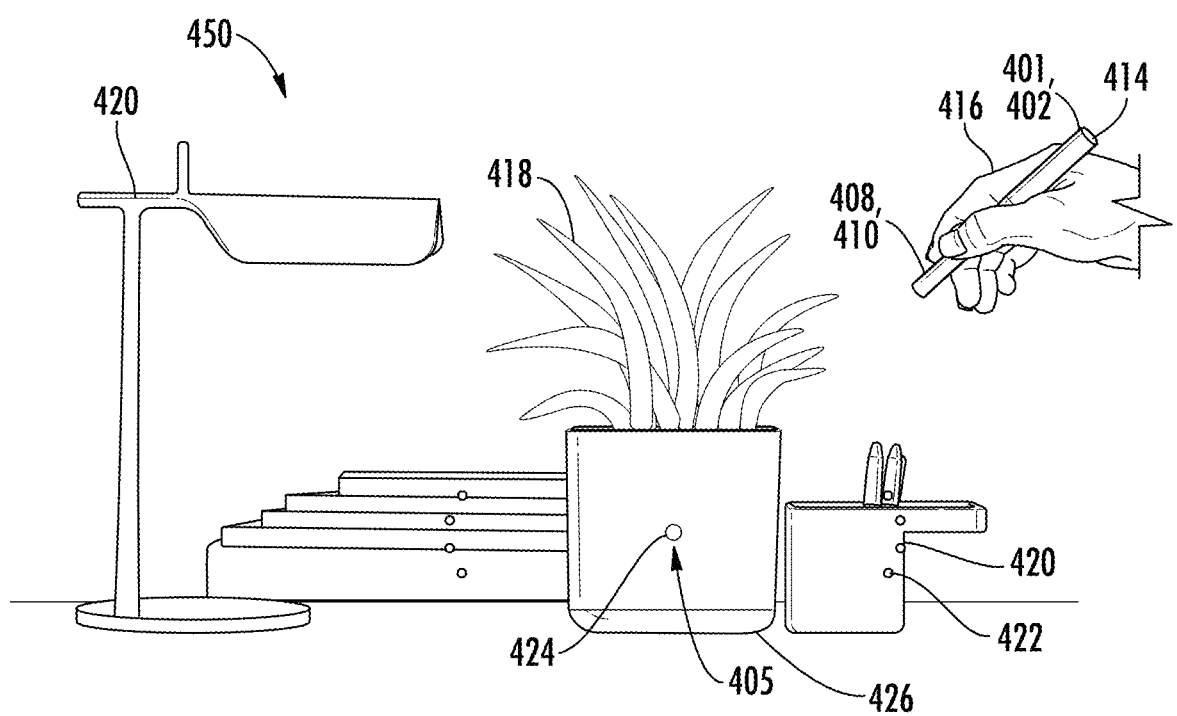
FIG. 4B depicts a hand of a user holding an example computing system emitting light onto a scene according to example embodiments of the present disclosure.

Referring to FIGS. 4A and 4B, in some implementations, the computing device 400 can control the light-emitting device 412 to indicate a "gaze" of the artificial intelligence system in the real world. In some implementations, the computing device 400 may generally be configured similarly to the computing device 300 of FIG. 3. The body 401 of the computing device 400 can be held in a hand 416 of the user be pointed as desired. The computing device 400 can use the light-emitting device 410 as a pointer to draw the user's attention to a particular object, for example by projecting emitted light 418 onto or adjacent the object. A camera 408 can be located adjacent the light-emitting device 410, for example as explained above with reference to FIG. 3. Alternatively or additionally, the user can manipulate the orientation of the light-emitting device 410 to select a certain object to bring to the attention of the artificial intelligence system.

As a simplified example, in some implementations, light-emitting device 410 may include a laser emitter, and the emitted light 418 can include a variety of suitable shapes formed by the emitted laser beams. For example, the emitted light 418 can include one or more focus indicators 420, 422 and a target indicator 424. The target indicator 424 can be located proximate a central location of the subject of the processing operation performed by the artificial intelligence system. The focus indicators 420, 422 can be located proximate outer bounds or edges of the object or region of the scene that is the subject of the processing operation performed by the artificial intelligence system. It should be understood that the target indicator 424 and focus indicators 420, 422 are merely one simplified example of the emitted light 418. The emitted light 418 can be shaped or configured in any suitable manner including projecting information (e.g., shapes, text, images, videos) on an object or objects in the scene 450.

Referring to FIG. 4B, the computing device 400 can control the light-emitting device 410 to emit light onto or adjacent at least one region of a scene 450 that includes the subject of the processing operation performed by the artificial intelligence system. The computing device 400 can obtain an image of the scene 450 captured by the camera 406 and can generate an attention output that describes at least one region of the scene that includes a subject of a processing operation performed by the artificial intelligence system. The subject of the processing operation can be an object being recognized, analyzed, or that is associated with an output of an artificial intelligence system, such as an answer to a question posed by the user or the response to a command issued by the user.

As an example, the user can direct the camera 408 of the computing device 400 towards a group of objects (e.g., a container 426, a plant 428, and a lamp 430). The artificial intelligence system can produce an attention output associated with at least one of the objects 426, 428, 430, and the computing device 400 can control the emitted light 418 onto or adjacent a region of the scene 450 such that the emitted light 418 indicates a subject of the artificial intelligence system's "focus."

The computing device 400 can control the emitted light 418 such that the target indication 424 is on or near a subject of the processing operation performed by the artificial intelligence system. In this example, container 426 may be the subject processing operation performed by the artificial intelligence system. The focus indicators 420, 422 may be located near outer edges of the container 426 to indicate the scope or range of the subject.

The artificial intelligence system can be configured to select the object or region of the scene 450 in response to a query presented by the user of the computing device 400. For instance, the user can present a question or command about the scene 450 to the computing device 400 (e.g., by speaking a question), and the artificial intelligence system can produce an attention output that answers or attempts to answer the user's question or command.

As another example, the user can ask a question about which object 426, 428, 430 (or objects) within the scene 450 satisfies a criteria, and the computing device 400 can emit light in a manner that indicates at least one object (e.g., the container 426) that the artificial intelligence system has selected in response to the question.

As another example, the user can direct the camera 408 of the computing device 400 towards a surface having writings or marking on the surface. The computing device 400 can emit light on to the surface in a manner that shows that the artificial intelligence system has recognized and/or interpreted the writings or markings. For instance, the emitted light could outline, underline, or otherwise identify one or more of the writing or markings, which could indicate an answer to a question about the writings or markings.

In some implementations, the light-emitting device 410 can include a projector. The projector can be configured to project images in a similar manner as a display screen. For example, the projector may be capable of projecting graphics such as videos, images, interactive displays, etc. The graphics can describe a variety of information.

As another example, the user may point the computing device 400 at an object, and may optionally speak a request for information about the object. The computing device 400 may recognize the object and collect meta-data associated with the object. The computing device 400 may display a graphic on or adjacent the object describing the meta-data. For instance, the user can point the computing device 400 at a book, and the light-emitting device 410 can project book reviews on a surface near the book or on a cover of the book. Referring again to FIG. 4B, as another example, the user could ask "What type of plant is this?" and the computing device 400 could control the light-emitting device 410 to project onto a region of the scene (e.g., onto a side of the container 426) a the name of the plant species, and optionally other information including local stores selling the plant species, distances to the closest stores, cost, care instructions, etc. As yet another example, for an edible object, the projected information could include nutritional information (e.g., caloric content) and/or allergy information.

In some implementations, the computing device 400 can be configured to adjust a direction of emission of the light 418 relative to the computing device 400 such that, when the computing device 400 (and therefore the light-emitting device 410) is moved relative to the scene 450, the light 418 continues to be emitted onto or adjacent the at least one region of the scene 450 that includes the subject (e.g., the container 426). As an example, the user can adjust a position of the computing device 400 relative to the scene, for example, to better view the display screen 414 of the computing device 400. Despite the movement of the computing device 400 (including the light-emitting device 410), the computing device 400 can adjust the direction of the light emission such that the light 418 continues to indicate the subject (e.g., the container 426) of the operation performed by the artificial intelligence system.

In some implementations, the computing device 400 (e.g., the artificial intelligence system) can be configured to access information from the user's calendar, contacts, or other personal information (if the user has granted permission for the computing device 400 to do so). The computing device 400 can project one or more graphics describing such information on or adjacent objects in a meaningful way. For instance, the user can point the computing device 400 at a clock, and the computing device 400 can project graphics describing upcoming events (e.g., meetings, appointments, etc.) from the user's calendar next to the time that event is scheduled. The graphics can include information about the event, such as name, description, etc.

Figure 5A:
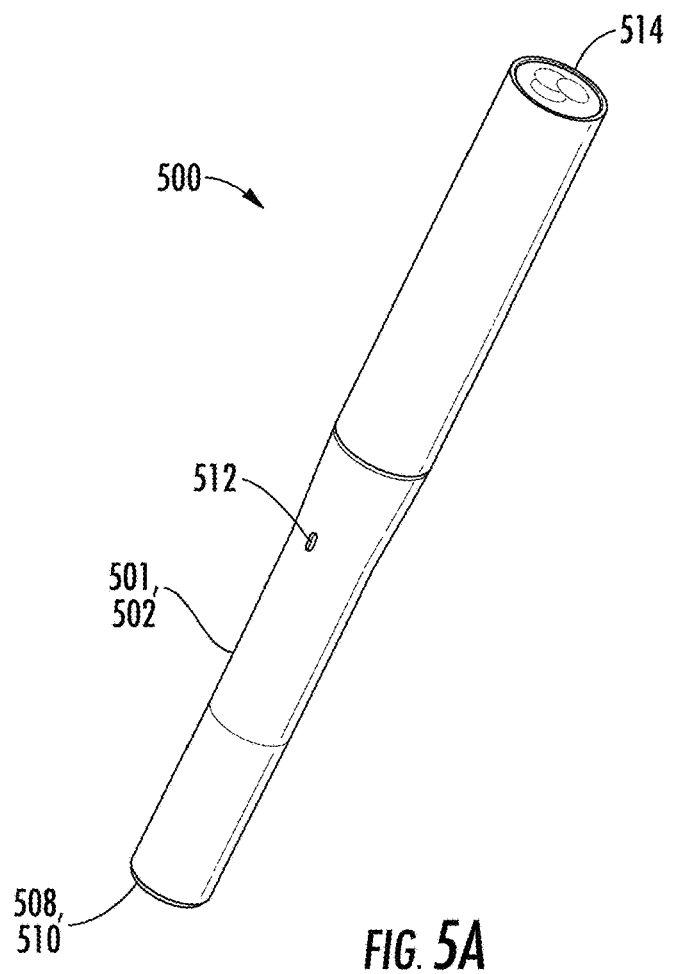
FIG. 5A depicts an example computing system having an elongated, cylindrical body and a display screen that is displaying a confidence graphic according to example embodiments of the present disclosure.
Figure 5B:
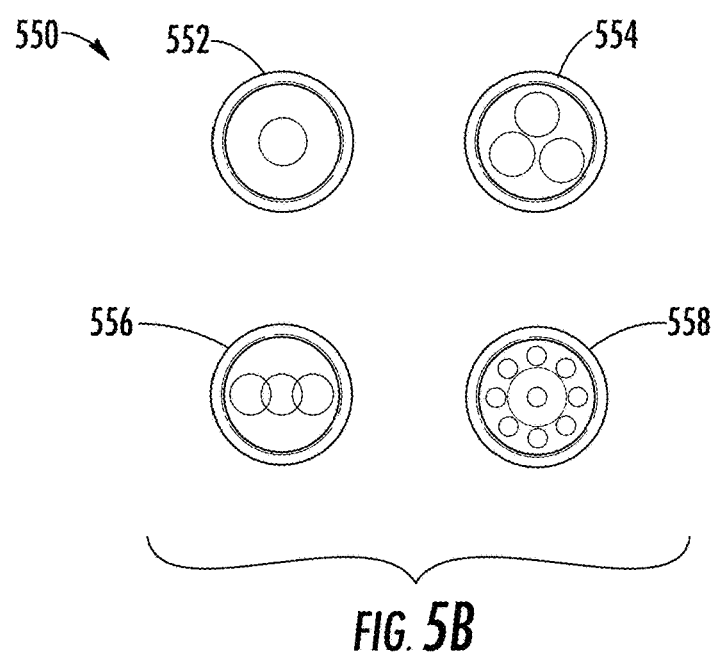
FIG. 5B depicts example confidence graphics according to example embodiments of the present disclosure.

FIG. 5A depicts an example computing device 500 having an elongated, cylindrical body 501 and a display screen 514 that is displaying a confidence graphic according to example embodiments of the present disclosure. FIG. 5B depicts example confidence graphics according to example embodiments of the present disclosure. In some implementations, the computing device 500 may generally be configured in a similar manner as the computing device 300 of FIG. 3.

The confidence graphic can describe a confidence of the artificial intelligence system in its decisions, understanding, or other outputs. For example, the computing device 500 can include a machine-learned model configured to produce an output and a confidence value associated with the output, for example as described above with reference to FIG. 2C. The computing device 500 can display a confidence graphic on its display screen 514 that graphically describes the confidence associated with the output of the machine-learned model.

The confidence graphic can communicate the confidence of the artificial intelligence system in a manner that is easily interpreted and/or understood by the user. As examples, the confidence graphic can include a shape density, a color combination, and/or a shape movement characteristic that describes the confidence output by the machine-learned model. As the machine-learned model performs an analysis, the confidence graphic can change to reflect a changing confidence level associated with the output. For example, the confidence level of the artificial intelligence system can increase as the machine-learned model converges on a likely answer or solution to the question or analysis being performed. The hand-held computing device can update the display of the confidence graphic to convey this change in status to the user.

Referring to FIG. 5B, as an example, a single, stationary, and/or small shape 552 (e.g., a stationary central dot) may indicate a high confidence or convergence on a solution. A plurality of shapes 554 may indicate that the artificial intelligence system has a low confidence or has not yet converged on a solution. Aspects of the shapes 554 (e.g., color, size, location) may change to display additional metrics associated with the confidence. For instance, the shapes 554 may rotate (e.g., about a center of the display screen), and the speed of such rotation may indicate a rate of convergence. Once a confidence threshold has been reached and/or the artificial intelligence system has converged on a solution, a single shape 552 may be displayed. Alternatively, the shapes 554 may be rearranged in a configuration 556, which can be indicative of a status of the artificial intelligence system (e.g., convergence, non-convergence, etc.) The size, number, and movement of the shapes may be varied to represent various metrics associated with the confidence of the artificial intelligence system. As an example, small, numerous shapes 558 may represent that the artificial intelligence system requires more information (e.g., contextual information) before a solution can be reached. It should be understood that many other variations or combinations are possible within the scope of this disclosure.

Other confidence signals can be used as well such as vibratory signals (e.g., frequency of vibration indicative of confidence), audio signals (e.g., pitch indicative of confidence), and/or other signals, in addition or alternatively to confidence, the device can also use different signals or graphics to indicate varying levels of urgency.

The use of confidence signals such as confidence graphics can improve the effectiveness of the artificial intelligence system. For example, the user can be able to easily evaluate the reliability of an output of the artificial intelligence system. The user can also be able to quickly assess whether the artificial intelligence system is converging on an answer or solution to a question. This may permit the user to estimate a remaining time until the artificial intelligence system has drawn a reliable conclusion. The user may also be able to deduce from the confidence graphic when the artificial intelligence system is not likely to converge on an answer or solution in a reasonable time period. The user can then re-phrase the question, pose a different question, assign a new task to the artificial intelligence system, troubleshoot the problem, or the like.

According to another aspect of the present disclosure, the user can be able to control data collection by the computing device in an easy and intuitive manner. The device may also learn to automatically switch its data collection modes based on context or other information. More particularly, the computing device can selectively collect information about a surrounding environment (e.g., recording audio or capturing images/video) and can input at least a portion of the collected information into one or more machine-learned models. The device can selectively switch from one of a plurality of data collection modes to another of the plurality of data collection modes. The data collection modes can include a permissible collection mode and a prohibited collection mode. In the permissible collection mode, the computing device can be permitted to collect information from the surrounding environment. In the prohibited collection mode, the computing device can be prohibited from collecting information from the surrounding environment. The computing device can provide an indication of its current data collection mode to the user.

Figure 6A:
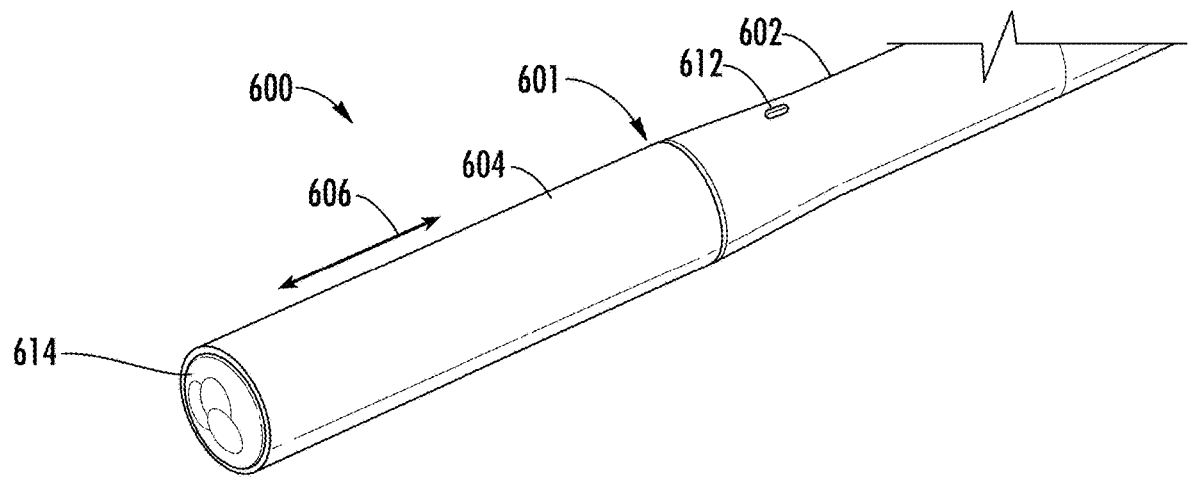
FIGS. 6A and 6B depict a perspective view of an example computing system including a body having a first portion that is moveable relative to a second portion in a first state and second state, respectively, according to example embodiments of the present disclosure.
Figure 6B:
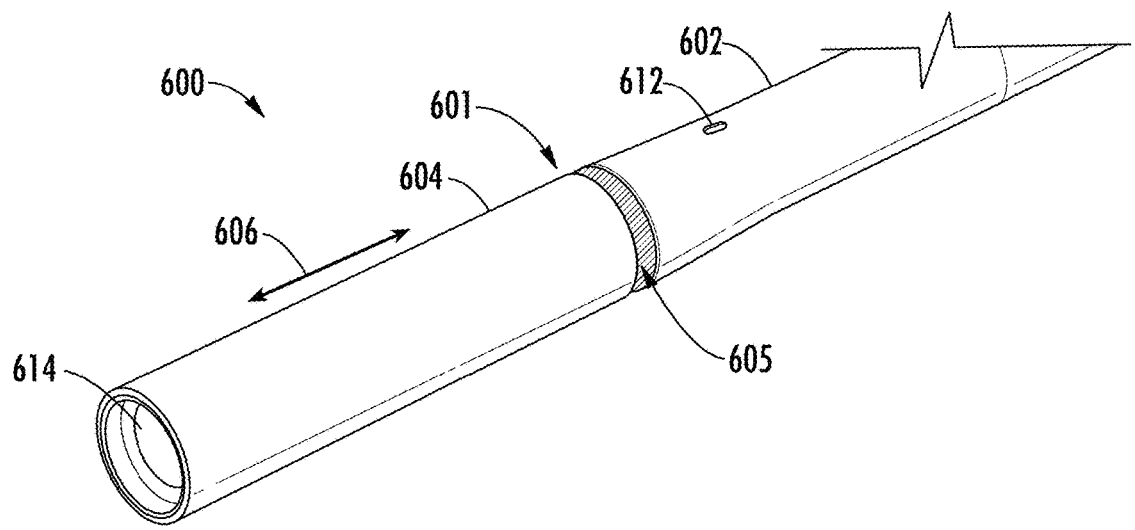

Referring to FIGS. 6A and 6B, in some implementations, the computing device 600 can be switched between modes by physically manipulating an aspect of a body 601 of the computing device. In some implementations, the computing device 600 may generally be configured in a similar manner as the computing device 300 of FIG. 3. The computing device 600 can include a body 601 having an elongated, cylindrical shape. The body 601 can include a first portion 602 and a second portion 604, which can be moveable relative to the first portion 602. The computing device 600 can be configured to detect movement of the second portion 604 relative to the first portion 602 and switch from one of the plurality of data collection modes to another of the plurality of data collection modes based on detecting such movement. For example, the second portion 604 can be configured to translate or slide (represented by arrow 606) along a longitudinal axis of the elongated, cylindrical body relative to the first portion 602. As another example, the second portion 604 can be configured to rotate (e.g., about the longitudinal axis) relative to the first portion. As a further example, the body 601 may include a button that is pressed to switch the computing device between modes.

In some implementations, movement of the second portion 604 relative to the first portion 602 can cause a region 605 of the cylindrical body to be either displayed or become obscured. The region 605 of the cylindrical body 601 that is displayed or obscured can be indicative of the current data collection mode of the computing device. For example, referring to FIG. 6B, the second portion 604 may be slidable away from the first portion 602 along a longitudinal axis of the elongate, cylindrical body 601 (represented by arrow 606) to reveal a previously obscured region 605 of the first portion 602. The previously obscured region 605 can have a different appearance (e.g., be differently colored, patterned, textured, or illuminated) than surrounding regions of the first portion 602 of the body 601. This may provide a clear visual indication to the user of the current data collection mode of the computing device 600.

For example, FIG. 6A can illustrate the computing system 600 in the permissible collection mode. The region 605 can be obscured, and the display screen 610 can display a graphic. FIG. 6B can illustrate the computing system 600 in a "hooded" mode, which can correspond with the prohibited collection mode. In the "hooded" mode, the previously obscured region 605 can be displayed, and the display screen 614 can be free of any graphics or turned off completely. The second portion 604 can partially obscure the display screen 614 and/or a camera, which may be located behind the display screen 614.

FIGS. 6C and 6D illustrate another example computing system 650 according to example embodiments of the present disclosure. The computing system 650 can include a first portion 652 and a second portion 654 that can be retractable (illustrated by arrows 656) within the first portion 652. The second portion 654 can be generally cylindrical and include a display screen 658 disposed on at least a portion of an outer circumferential surface of the second portion 654. When the second portion 654 is retracted at least partially within the first portion 652, for example as illustrated in FIG. 6D, some or all of the second portion 654 can be obscured from view by the first portion 652, including, for instance, the some or all the display screen 658.

These features can provide the user with a clear visual cue and/or tactile feedback about when the computing device 602, 650 is permitted to collect information. The user can more easily instruct the computing device 602, 650 to switch between modes and verify that the switch has been completed as instructed. The user can also easily communicate to others nearby that the computing device 602, 650 is not listening or recording. This communication ability may improve the usability and efficiency of the computing device 602, 650, for example, for performing tasks associated with a "personal assistant." The computing device 602, 650 can be configured to perform any suitable task, however, not limited to those generally associated with a personal assistant.

In some implementations, the computing device 600, 650 may be configured to perform or continue operations when in the prohibited collection mode, yet not be permitted to collect data about the environment around the device 600, 650. The computing device 600, 650 may still be permitted to communicate wireless, including connecting to the Internet and/or a local network, and the artificial intelligence system may be permitted to perform computations. However, the device 600, 650 and/or the artificial intelligence system may be blocked from accessing one or more sensors (e.g., microphone, camera, etc.) configured to collect information about the environment around the device 600, 650. As an example, the user may ask a question or give a command to the device 600, 650, and then switch the device 600, 650 to the prohibited collection mode. While in the prohibited collection mode, the artificial intelligence system may still be permitted to analyze the question or command, reference various on-device database, and/or Internet-based operations such as queries, purchases, orders, etc. For instance, the user may ask the device 600, 650 to purchase movie tickets at the nearest theater for a specific movie. The user may then switch the device 600, 650 to prohibited collection mode (e.g., by physically manipulating one or more portions of the device) such that the user the device 600, 650 can no longer collect audio or video information. The device 600, 650 may then purchase the movie tickets while in the prohibited collection mode.

Figure 7A:
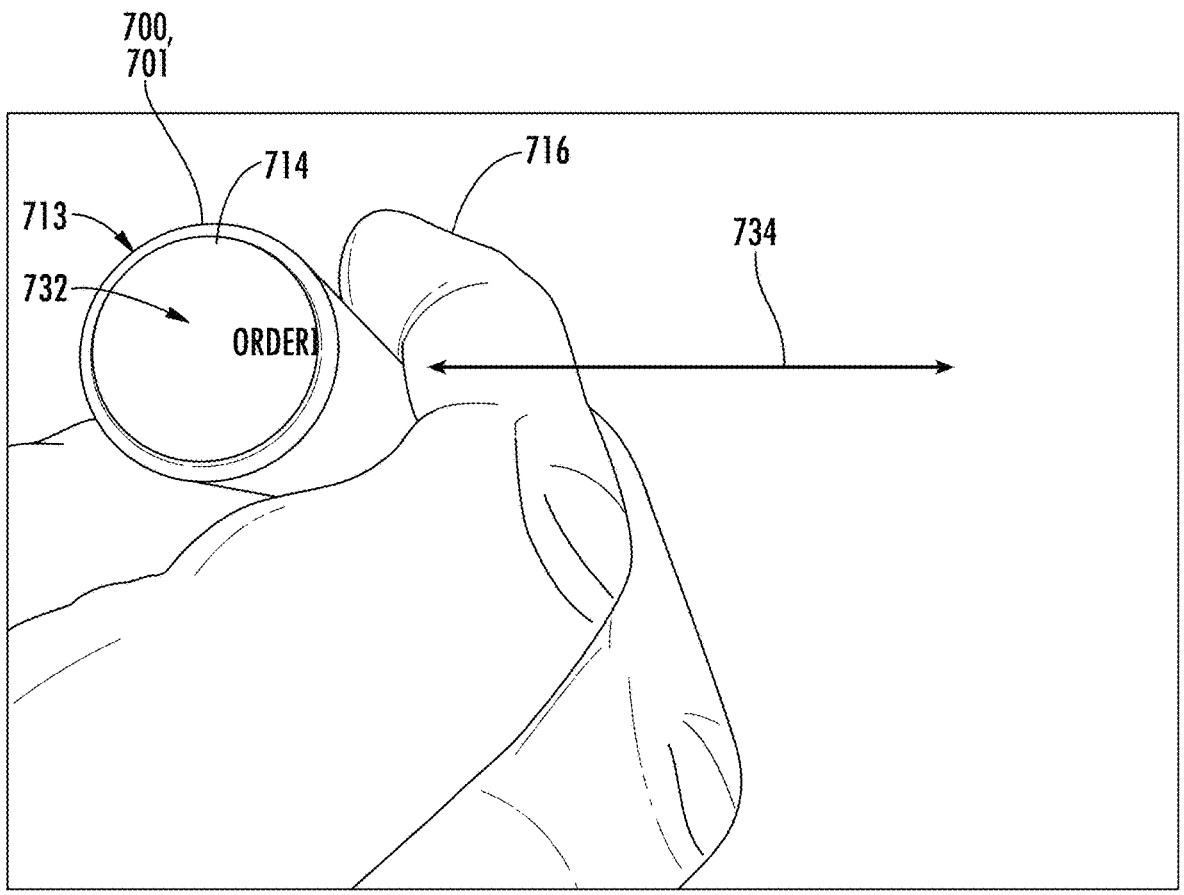
FIG. 7A depicts a hand of a user manipulating an example computing system having a display screen for displaying visual information to the user according to example embodiments of the present disclosure.
Figure 7B:
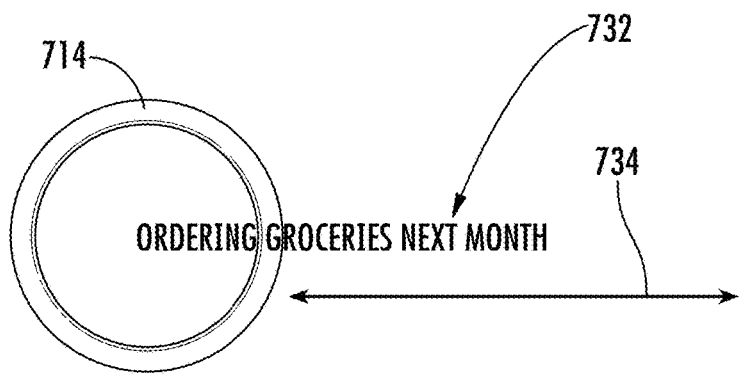
FIG. 7B depicts a simplified diagram of a method for displaying visual information to a user using the example computing system of FIG. 7A according to example embodiments of the present disclosure.

Referring to FIGS. 7A and 7B, in some implementations, the computing device 700 can provide a "key hole interface." In some implementations, the computing device 700 may generally be configured in a similar manner as the computing device 300 of FIG. 3. The key hole interface can provide a quick window into a virtual or digital object or experience. FIG. 7A depicts a hand 716 of a user manipulating an example computing device 700 having a display screen 714 for displaying visual information to the user according to example embodiments of the present disclosure. FIG. 7B depicts a simplified diagram of a method for displaying visual information to a user using the example computing device 700 of FIG. 7A according to example embodiments of the present disclosure.

More particularly, in some implementations, the handheld computing device 700 can include a relatively small display screen 714 (e.g., positioned at the end of an elongated, cylindrical body). The hand-held computing device 700 can receive data descriptive of a virtual object 732 (e.g., text, an image, a 3-D object, a 3-D environment that has a virtual location in three-dimensional space, etc.). In this example, the virtual object 732 includes a single line of text.

The hand-held computing device 700 can display a portion of the virtual object 732 on the display screen 714. The portion of the virtual object 732 displayed on the display screen 714 can have a virtual location that is along a projection of the longitudinal axis from the second end 713 of a body 701 of the computing device 700 at a current pose of the body 701 of the device 700. In response to movement (represented by arrow 734) of the body 712 from the current pose to the new pose, the device 700 can update the display screen 714 such that the display screen 714 displays a new portion of the virtual object 708 that has a virtual location that is along the projection of the longitudinal axis from the second end at the new pose of the body 701.

Thus, the computing device 700 can provide the user with a small window or "key hole" into a virtual environment that is larger than the display screen 714. The computing device 700 can create the illusion that the virtual object 732 is remaining stationary at the virtual location when the computing device 700 and display screen 714 are moved. The user can then move the computing device 700 to display different portions of the virtual object 732 as the user desires. For example, as illustrated in FIGS. 7A and 7B, the user may move the computing device 700 to the right (represented by arrow 734) to view the entire virtual object 732.

Using this feature, the user can quickly and efficiently view the contents of a virtual object 708 that is relatively large compared with the display screen 706. For example, the body 712 of the hand-held computing device 704 may have an elongated, cylindrical shape and can be roughly the size of a pen or stylus such that the computing device 704 can be easily held in a hand 702 of the user. The display screen 714 can be disposed at the second end 713 of the body 701 and housed within the elongated, cylindrical body 701, for example as described with reference to FIG. 3. For instance, the display screen 714 can have an outer lens or cover that faces outward along the longitudinal axis of the body 701 at the second end 713 of the elongated, cylindrical body 701. The display screen 714 can generally be smaller than the body 701. For example, a ratio of a length of the body 701 to a diameter of the display screen 714 can range from 3 to 30, in some embodiments from 4 to 20, in some embodiments from 5 to 10.

This configuration can also allow the user to privately or semi-privately view the virtual object in a public location. The small size of the display screen 714 can inhibit or prevent bystanders from easily viewing the virtual object 732. Additionally, in some implementations, the display screen 714 may be configured as a narrow angle display such that the contents of the display screen 714 can only effectively be viewed from a vantage point that is approximately tangent to the display screen 714. The display screen 714 may include a coating or structure that obscures the content of the display screen 714 when viewed from angles greater than a threshold angle with respect to the longitudinal axis of the body 701 (e.g., about 20 degrees). Such a feature may allow only the user to privately or semi-privately view the contents of the display screen 714 in a public place, for example.

The virtual object 732 can include a variety of suitable objects. As an example, the virtual object 732 can include text, such as a line of text, for example as illustrated in FIG. 7A. The virtual object 732 can also comprise an image, 3-D object, environment. The virtual object 732 can include any visual information for display to the user, however.

Figure 8A:
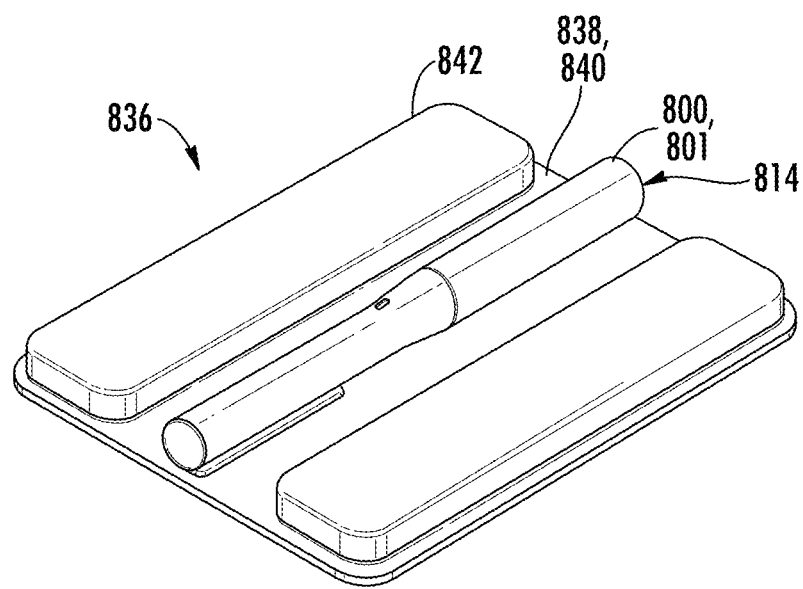
FIG. 8A depicts a perspective view of an example computing system including a docking device in an opened configuration according to example embodiments of the present disclosure.

Referring to FIG. 8A, according to another aspect of the present disclosure, in some implementations, a computing device 800 can be part of a larger system 836 that includes a docking device 838. In some implementations, the computing device 800 may generally be configured in a similar manner as the computing device 300 of FIG. 3. The docking device 838 and the computing device 800 can be configured to wirelessly communicate with each other. The docking device 838 can be configured to be coupled with the body 801 of the computing device 800. As an example, the docking device 838 can be configured to receive or otherwise attach or connect to the body 801.

Figure 8B:
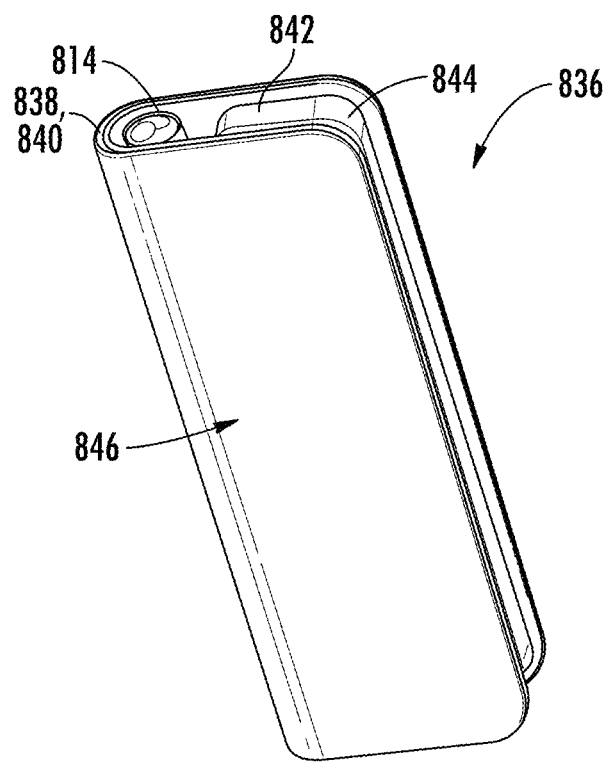
FIG. 8B depicts a perspective view of an example computing system including a docking device in a closed configuration according to example embodiments of the present disclosure.

For example, FIG. 8A depicts a perspective view of an example computing system 800 including a docking device 838 in an opened configuration according to example embodiments of the present disclosure. FIG. 8B depicts a perspective view of an example computing system 836 including a docking device 838 in a closed configuration according to example embodiments of the present disclosure.

The docking device 838 may be configured to receive or otherwise couple with the computing device 800. For example, the docking device 838 may be foldable from the opened configuration illustrated in FIG. 8A to the closed configuration illustrated in FIG. 8B. The docking device 838 may include a base layer 840 and one or more protruded regions 842, 844. In the closed configuration, the docking device 838 may be configured to retain the computing device 800 in a space formed between the base layer 840 and the protruded regions 842, 844.

In some implementations, magnetic connections are used to physically hold the computing device 800 to the docking device 838. For example, magnetic connections can be used in addition to the docking device 838 mechanically retaining the computing device 800 (e.g., by folding around the body of the computing device 800 as illustrated in FIGS. 8A and 8B). In other implementations, only magnetic connections are used so that the body 801 of the computing device 800 easily snaps in and out of connection with the docking device 838.

Referring to FIG. 8B, in some implementations, the docking device 838 can include a display screen 846. The docking device 838 can be configured to display an output of the artificial intelligence system on the display screen 846 of the docking device 838. The docking device 838 can be configured such that, when the body 801 of the computing device 800 is coupled with the docking device 838, the display screen 846 of the docking device 838 is positioned proximate a display screen 814 of the computing device 800. The computing device 800 can be configured to produce display information on both the display screen 814 of the computing device 800 and the display screen 846 of the docking device 838 in an extended display manner. For example, a display object or image can be displayed across both screens such that the display screen 814 of the docking device 838 acts as an extended display area of the screen 814 of the computing device 800.

In some implementations, the display screen 814 of the computing device 800 can provide a condensed visual or graphical interface, and when the body 801 of the computing device 800 is connected to the docking device 838, the computing device 800 can automatically switch display modes such that the display screen 814 of the docking device 838 displays an uncondensed visual or graphical interface. Thus, the docking device 838 can provide additional screen real estate that enables deeper interactions. Furthermore, in implementations in which the docking device 838 can fold around the body 801 of the computing device 800, a flexible display 814 can be used so that the display 814 also folds around the body 801 of the computing device 800, thereby creating a multi-sided display.

In other implementations, in addition or alternatively to the docking device 838, the computing device 800 can extend or project display information onto other display screens (e.g., including screens to which the device is not physically connected). Thus, the computing device 800 can push experiences to partner screens for richer information. The computing device 800 can also select and control other devices in the world (e.g., Internet of Things devices), if enabled to do so.

Figure 9A:
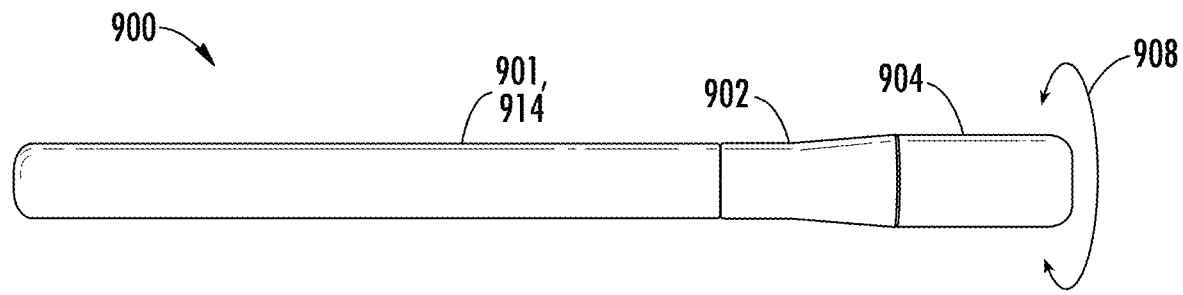
FIG. 9A depicts another example computing system including a display screen disposed on a circumferential surface of a body of the computing system according to example embodiments of the present disclosure.
Figure 9B:
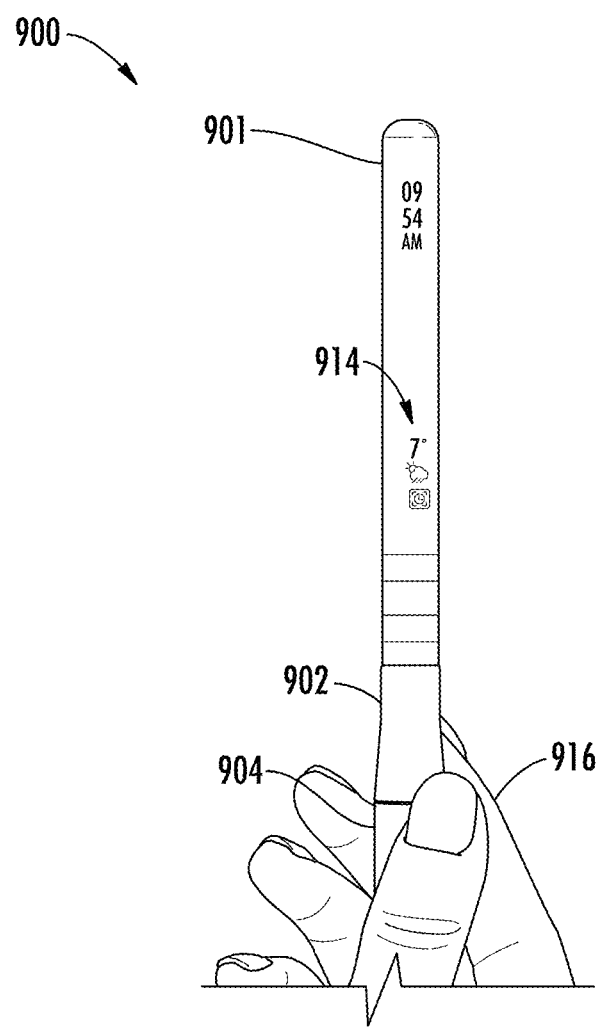
FIG. 9B depicts the computing system of FIG. 9A being held in the hand of a user.

FIG. 9A depicts an example computing device 900 including a display screen 914 disposed on a circumferential surface of a body of the computing system 900 according to example embodiments of the present disclosure. In some embodiments, a body 901 of the computing device 900 may include a first portion 902 and a second portion 904 that is rotatable (illustrated by arrow 908) relative to the first portion 902. The computing system may be configured to detect movement of the second portion 904 relative to the first portion 902 and switch from one of the plurality of data collection modes to another of the plurality of data collection modes based on detecting such movement, for example as described above with reference to FIG. 3. FIG. 9B depicts the computing device 900 of FIG. 9A being held in a hand 916 of a user.

Figure 10A:
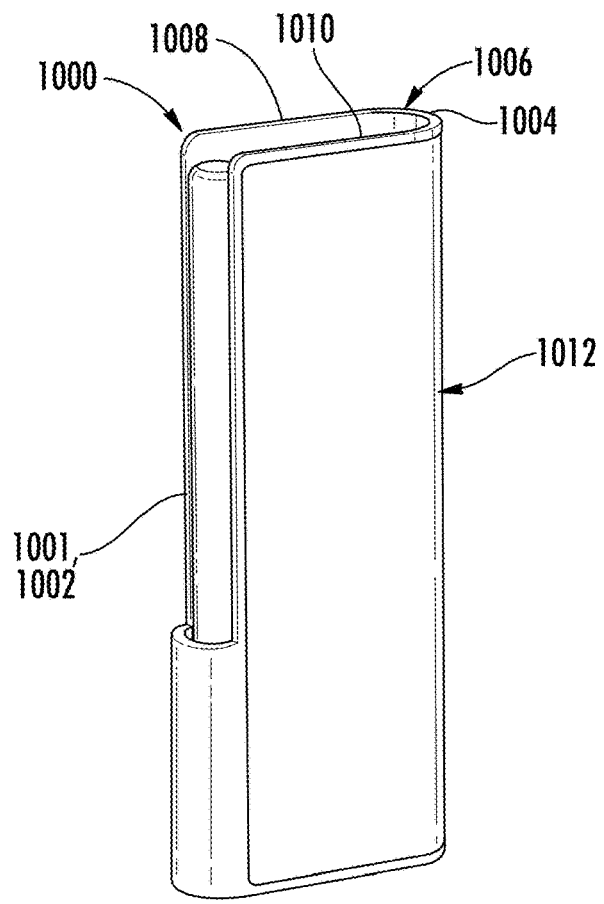
FIG. 10A depicts a perspective view of the computing system of FIGS. 9A and 9B including a docking device in a first configuration according to example embodiments of the present disclosure.

FIG. 10A depicts a perspective view of a computing system 1000 including a computing device 1002, for example as shown in FIGS. 9A and 9B. The computing system 1000 also includes a docking device 1004 in a first configuration according to example embodiments of the present disclosure. The docking device 1004 may be configured to couple with the docking device 1004 in a variety of different configurations. For example, the docking device 1004 may be foldable about a middle portion 1006, such that first and second portions 1008, 1110 are arranged in parallel with each other. The docking device 1004 may be configured to couple to a body 1001 of the computing device 1002 between respective ends of the first and second portions 1008, 1110 of the docking device 1002. A display screen 1012 may be disposed on an outside surface of the docking device 1004 that extends on each of the first portion 1008, second portion 1010, and the middle portion 1006.

Figure 10B:
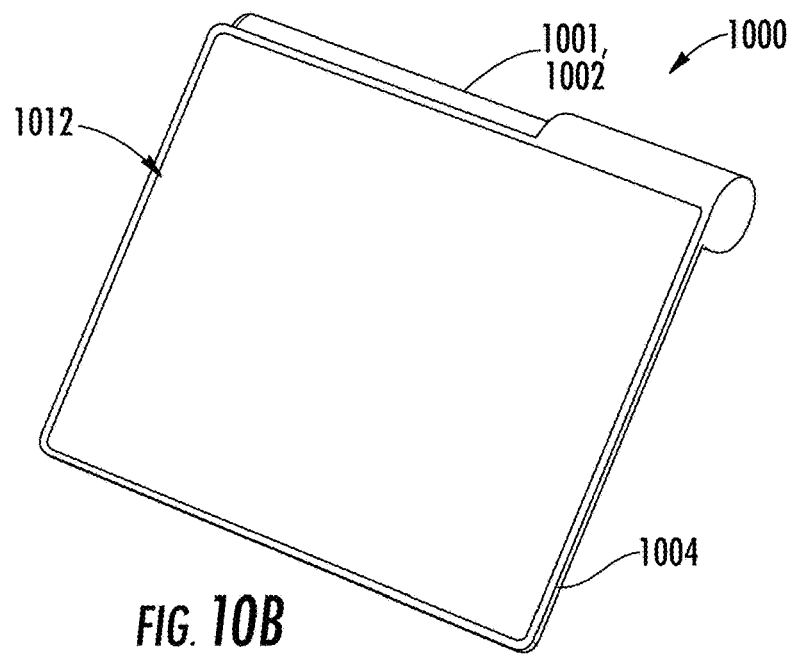
FIG. 10B depicts a perspective view of the computing system of FIGS. 9A and 9B including a docking device in a second configuration according to example embodiments of the present disclosure.

FIG. 10B depicts a perspective view of the computing device 1006, for example as shown in FIGS. 9A and 9B, including a docking device 1004 in a second configuration according to example embodiments of the present disclosure. In some implementations, the docking device 1004 may be configured to be arranged into the second configuration in which the docking device 1004 is generally flat or unfolded. The docking device 1004 may be configured to couple to a body 1001 of computing device 1002 along or proximate an edge of the docking device 1004. A display screen 1012 may be disposed on an outer surface of the docking device 1004. The docking device 1004 may be adjustable between the first and second configurations.

Figure 11A:
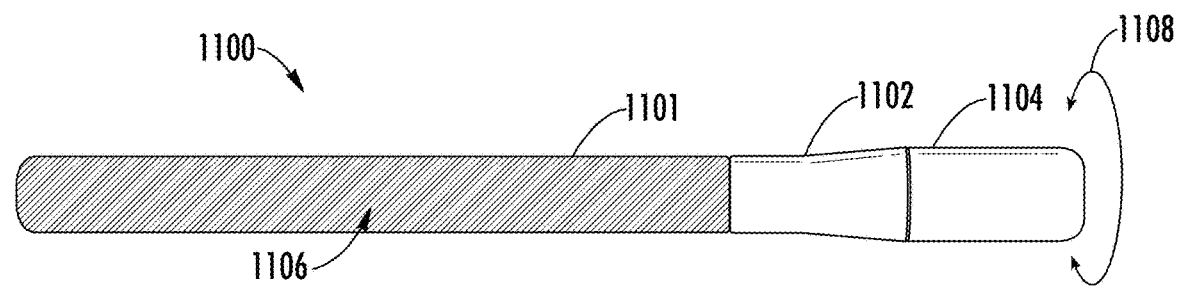
FIGS. 11A through 11C depict an example computing system providing indications of a variety of different data collection modes.
Figure 11B:
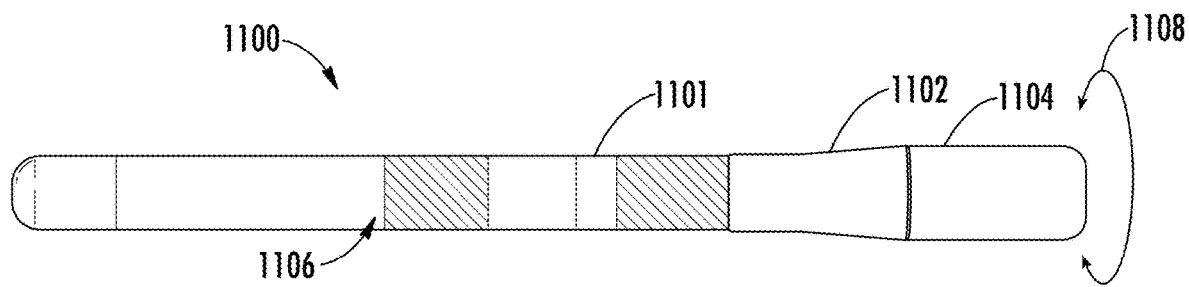
Figure 11C:
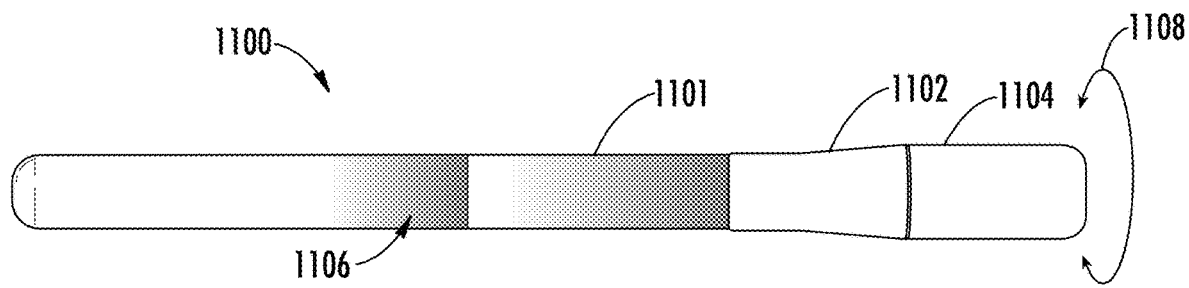

FIGS. 11A through 11C depict an example computing device 1100 providing indications of a variety of different data collection modes. The computing device 1100 may include a display screen 1106. The computing device 1100 may be configured to provide an indication of its current data collection mode to the user by altering the content of the display screen 1106, manner in which a graphic is displayed on the display screen 1106, and/or selectively turning the display screen 1106 on or off. For example, referring to FIG. 11A, the computing device 1100 may be configured to turn the display screen 1106 off when the computing device 1100 is in a prohibited collection mode, for example as discussed above with reference to FIGS. 6A and 6B. Referring to FIG. 11B, the computing device 1100 may be configured to provide a graphic on the display screen 1106 to indicate that the computing device is in a permitted collection mode. The graphic may be clearly displayed in the permitted collection mode.

In some implementations, the computing device 1100 may display a graphic on the display screen 1106, or apply a filter to the graphics displayed on the screen 1106, having a blurry, frosted, or fogged appearance to indicate a third data collection mode. As an example, the third data collection mode may correspond to an intermediate data collection mode, in which the computing device 1100 is permitted to detect (e.g., "listen" for) certain cue words or phrases associated with the user asking a question or giving a command to the computing device 1100. Other audio information that the computing device 1100 receives can be discarded without being recorded or analyzed. When the computing device 1100 detects the cue word(s), the computing device 1100 may switch a different mode. For example, the user may say "wake up" to switch from the intermediate data collection mode to the permissible data collection mode.

The user may also switch the computing device 1100 between the various modes by physically manipulating the body of the computing device 1100, for example, by rotating the second portion 1104 relative to the first portion 1102 (represented by arrow 1108 in FIGS. 11A through 11C), for example as described with reference to FIG. 9A.

The display screen 1106 can also provide information (e.g., confidence information) by displaying a number of different bands of color. The width and/or location of the bands of color can provide different meanings or information.

Example Methods

Figure 12:
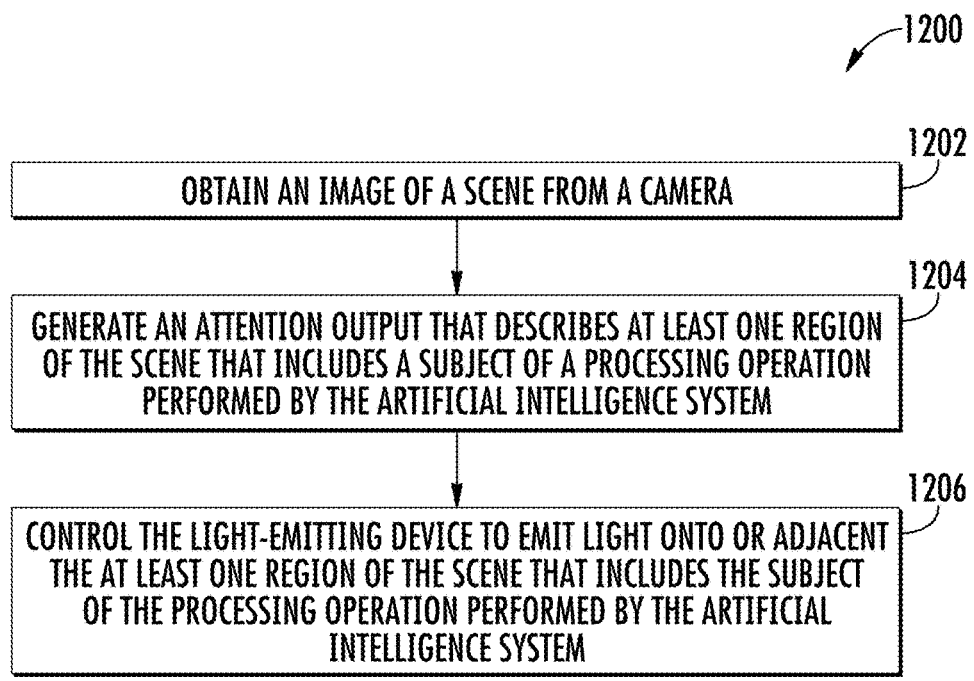
FIG. 12 depicts a block diagram of an example method for communicating information about a subject of a processing operation performed by an artificial intelligence system according to example embodiments of the present disclosure.

FIG. 12 depicts a block diagram of an example method for communicating information about a subject of a processing operation performed by an artificial intelligence system according to example embodiments of the present disclosure. Although FIG. 12 depicts steps performed in a particular order for purposes of illustration and discussion, the methods of the present disclosure are not limited to the particularly illustrated order or arrangement. The various steps of the method 1200 can be omitted, rearranged, combined, and/or adapted in various ways without deviating from the scope of the present disclosure.

The method 1200 may include, at (1202), obtaining an image of a scene from a camera. For example, the user may point a hand-held computing device including the camera at the scene, and the camera may capture the image of the scene. The computing device may include a camera disposed adjacent an end of the device for example, for example as described with reference to FIGS. 3, 4A, and 4B.

The method 1200 may include, at (1204), generating an attention output that describes at least one region of the scene that includes a subject of a processing operation performed by an artificial intelligence system. For example, the computing device may include an artificial intelligence system as described with reference to FIGS. 2A, 2B, 4A, and 4B.

Figure 13:
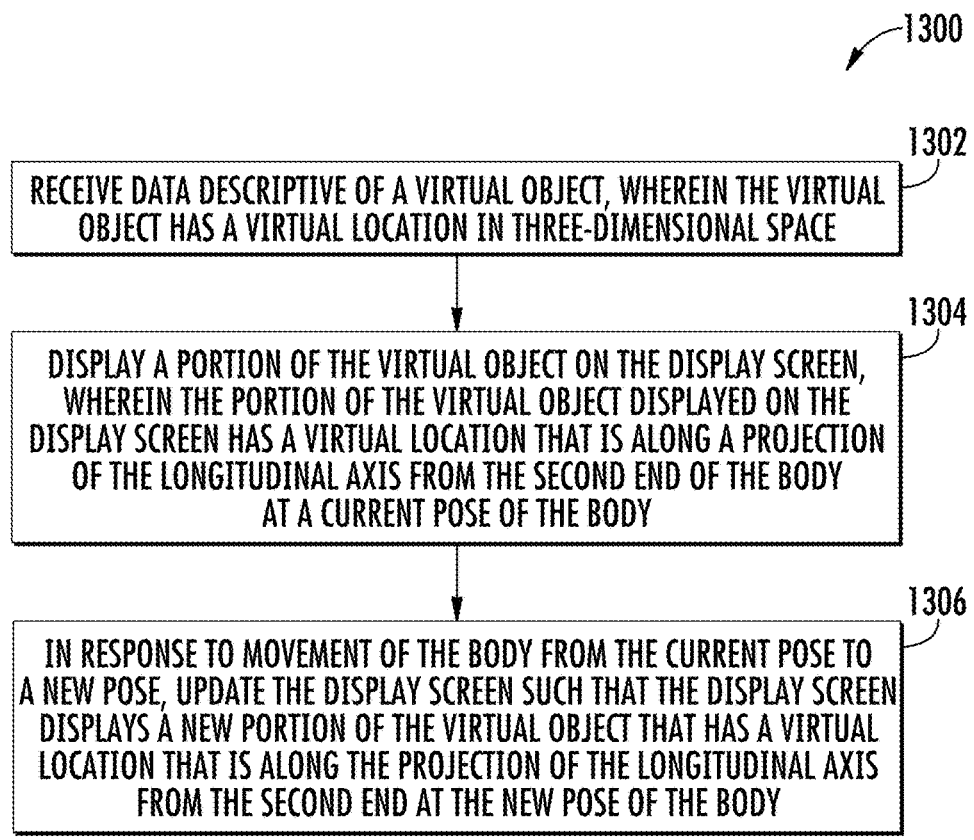
FIG. 13 depicts a block diagram of an example method for communicating visual information to a user of a computing device according to example embodiments of the present disclosure.

The method 1200 may include controlling a light-emitting device to emit light onto or adjacent the at least one region of the scene that includes the subject of the processing operation performed by the artificial intelligence system, for example as described with reference FIGS. 4A and 4B. In some implementations, the method may include adjusting a direction of emission of the light relative to the computing system such that the light continues to be emitted onto or adjacent the at least one region of the scene that includes the subject when the light-emitting device is moved relative to the scene FIG. 13 depicts a block diagram of an example method 1300 for communicating visual information to a user of a computing device according to example embodiments of the present disclosure. Although FIG. 13 depicts steps performed in a particular order for purposes of illustration and discussion, the methods of the present disclosure are not limited to the particularly illustrated order or arrangement. The various steps of the method 1300 can be omitted, rearranged, combined, and/or adapted in various ways without deviating from the scope of the present disclosure.

The method 1300 may include, at (1302), receiving data descriptive of a virtual object, wherein the virtual object has a virtual location in three-dimensional space. For example, a computing device may include an artificial intelligence system and/or a machine learned model that is configured to provide information that describes the virtual object. For instance, the virtual object may include a line of text, and the artificial intelligence system may output the line of text in response to a query from the user of the device.

The method 1300 may include, at (1304), displaying a portion of the virtual object on the display screen. The portion of the virtual object displayed on the display screen can have a virtual location that is along a projection of the longitudinal axis from the second end of the body at a current pose of the body. For example, the computing device may be configured to display the virtual object as described with reference to FIGS. 7A and 7B.

The method 1300 may include, at (1306), updating the display screen such that the display screen displays a new portion of the virtual object that has a virtual location that is along the projection of the longitudinal axis from the second end at the new pose of the body in response to movement of the body from the current pose to a new pose, for example as described with reference to FIGS. 7A and 7B.

Figure 14:
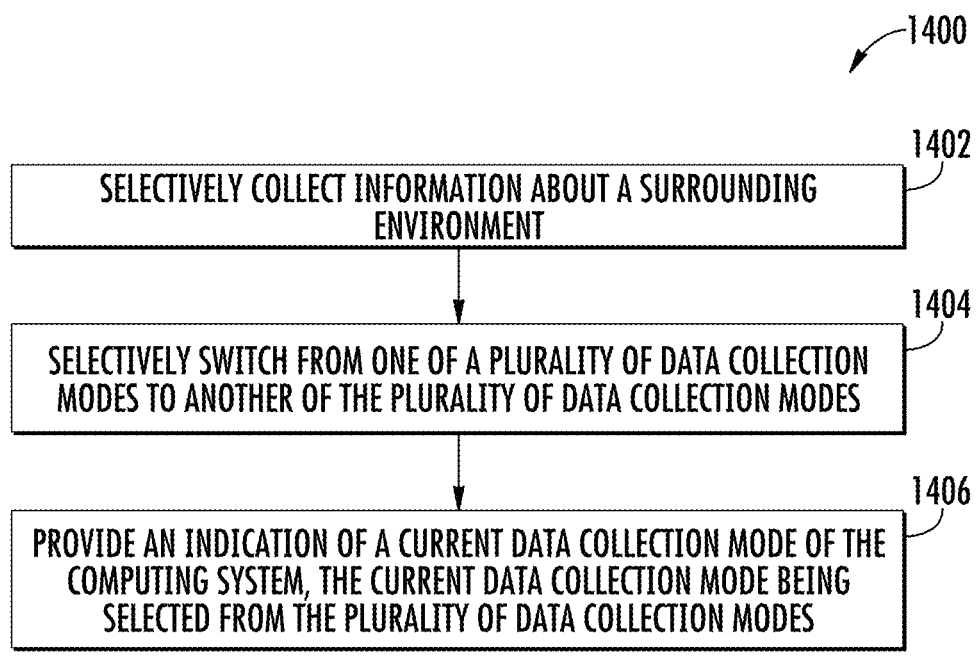
FIG. 14 depicts a block diagram of an example method for providing an indication of a current data collection mode associated with a computing system according to example embodiments of the present disclosure.

FIG. 14 depicts a block diagram of an example method 1400 for providing an indication of a current data collection mode associated with a computing system according to example embodiments of the present disclosure. Although FIG. 14 depicts steps performed in a particular order for purposes of illustration and discussion, the methods of the present disclosure are not limited to the particularly illustrated order or arrangement. The various steps of the method 1400 can be omitted, rearranged, combined, and/or adapted in various ways without deviating from the scope of the present disclosure.

The method 1400 may include, at (1402), selectively collecting information about a surrounding environment. For example, a computing device may include a microphone, camera, or the like. The computing system may include an artificial intelligence system, and the computing system (e.g., artificial intelligence system) may be configured to selectively collect audio, video, images, etc. from the environment surrounding the computing device.

The method 1400 may include, at (1402), selectively switching from one of a plurality of data collection modes to another of the plurality of data collection modes. For example, the plurality of data collection modes may include a prohibited collection mode, a permissible collection mode, and/or an intermediate collection mode as described above, for example with reference to FIGS. 6A through 7D and 11A through 11C. The computing device may be configured to switch between modes automatically or in response to a command or indication received from the user, including, for example, detecting movement of a second portion relative to a first portion of a body of the computing device, as described above.

The method 1400 may include, at (1402), providing an indication of a current data collection mode of the computing system, the current data collection mode being selected from the plurality of data collection modes. For example, the indication may include a graphic displayed on a display screen of the computing device. The indication may also include displaying a previously obscured region of the body of the device. The previously obscured region can have a different appearance (e.g., be differently colored, patterned, textured, or illuminated) than surrounding regions of the first portion of the body.

The user may be able to instruct the computing device to switch between modes, such as by voice command or other input. For instance, the user can instruct the computer system to switch to the prohibited collection mode when the user would prefer that the computing device refrain from collecting data. The computing device can indicate its current status to the user such that the user (and potentially other surrounding individuals) can quickly verify that the computing device has switched to the prohibited collection mode as instructed. Providing the indication of the current data collection mode can increase the user's confidence in his control over when the computing device collects data (e.g., records audio or captures visual information) and when the computing device is not permitted to do so. These features may make the user may be more comfortable with and/or trusting of the computing device, making it more effective, for example at performing personal assistant tasks.

The computing device can be configured to provide the indication of the current data collection mode in a variety of ways. As an example, the computer system can display a graphic that describes or is indicative of the current data collection mode of the computing device, for example as described with reference to FIGS. 5A and 5B. Each data collection mode can have an associated graphic, such that the user of the computing device can identify the current data collection mode based on the displayed graphic. As another example, the computing device can be configured to deactivate the screen such that the screen is free of a graphical display to indicate the current data collection mode. For instance, deactivating the screen can indicate that the computing device is in the prohibited collection mode, such that the user knows that the computing device is not collecting information.

As another example feature that enables intelligent interaction with the user and other humans, in some implementations, the computing device can include one or more physically manipulable components that enable the user to easily alter the outward appearance of the device, for example as described with reference to FIGS. 6A through 6D, 9A, and 11A through 11C. As one example, the device can include a first portion that can be selectively placed over or removed to reveal a second portion of the device, thereby acting as a "hood." As another example, the second portion of the device can be insertable within the first portion so that the second portion is no longer outwardly visible. These and other similar interactions with the device can provide clear social signals to other persons in the vicinity of the device.

Thus, the user can quickly disconnect the artificial intelligence system from sensors and can show others that they have done so.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
   a camera;
   a light-emitting device having an adjustable direction of emission;
   an artificial intelligence system that comprises one or more machine-learned models;
   one or more processors; and
   one or more non-transitory computer-readable media that collectively store instructions that when executed by the one or more processors cause the computing system to:
   obtain a query from a user;
   obtain an image of a scene captured by the camera of a computing device, wherein the scene comprises a plurality of objects;
   generate, by the artificial intelligence system and based on the query and the image of the scene captured by the camera, an attention output that describes at least one region of the scene that includes a subject of a processing operation performed by the artificial intelligence system, wherein the attention output indicates that the subject is responsive to the query, wherein the subject comprises an object of the plurality of objects selected based on the query; and
   in response to generating the attention output;
   adjust the direction of emission of the light-emitting device relative to the computing device such that the light-emitting device emits light onto or adjacent the at least one region of the scene that includes the subject of the processing operation performed by the artificial intelligence system; and
   provide a plurality of focus indicators for display, wherein the plurality of focus indicators indicate outer bounds of the subject, and wherein the plurality of focus indicators comprise a plurality of emitted laser beams.

2. The computing system of claim 1, wherein the artificial intelligence system comprises a machine-learned selection model configured to receive the image of the scene and, in response, provide the attention output that describes the at least one region of the scene that includes the subject.

3. The computing system of claim 1, further comprising an elongated, cylindrical body that houses the camera, light-emitting device, artificial intelligence system, one or more processors, and one or more non-transitory computer-readable media.

4. The computing system of claim 1, wherein the one or more machine-learned models comprise an object recognition model and the at least one region of the scene includes at least one object recognized by the object recognition model.

5. The computing system of claim 1, wherein the instructions further cause the computing system to adjust a direction of emission of the light relative to the computing system such that the light continues to be emitted onto or adjacent the at least one region of the scene that includes the subject when the light-emitting device is moved relative to the scene.

6. The computing system of claim 1, further comprising a docking device configured to wirelessly communicate with the one or more processors, the docking device comprising a display screen.

7. The computing system of claim 1, wherein the operations further comprise:
   determining a confidence value of the attention output; and
   providing a confidence signal associated with the confidence value via at least one of a display screen, one or more vibratory signals, or one or more auditory signals.

8. The computing system of claim 1, wherein the light comprises one or more target indicators, wherein the one or more target indicators are located on or near the subject.

9. The computing system of claim 1, wherein adjusting the direction of emission of the light-emitting device relative to the computing device comprises:
   when the computing device is moved relative to the scene, the direction of emission of the light-emitting device relative to the computing device is adjusted such that the light-emitting device continues to emit light onto or adjacent the at least one region of the scene that includes the subject of the processing operation performed by the artificial intelligence system.

10. The computing system of claim 1, wherein the light comprises a target indicator, wherein the target indicator is associated with a central location of the subject of the processing operation performed by the artificial intelligence system.

11. A hand-held computing device, the device comprising:
    an elongated, cylindrical body having a first end and a second end that is opposite the first end along a longitudinal axis of the body;
    a camera disposed adjacent the first end;
    a light-emitting device disposed adjacent the camera at the first end, wherein the light emitting device has an adjustable direction of emission;
    an artificial intelligence system that comprises one or more machine-learned models;
    one or more processors; and one or more non-transitory computer-readable media that collectively store instructions that when executed by the one or more processors cause the hand-held computing device to:
  obtain a query from a user;
  obtain an image of a scene captured by the camera, wherein the scene comprises a plurality of objects;
  generate, by the artificial intelligence system and based on the query and the image of the scene captured by the camera, an attention output that describes at least one region of the scene that includes a subject of a processing operation performed by the artificial intelligence system, wherein the attention output indicates that the subject is responsive to the query, wherein the subject comprises an object of the plurality of objects selected based on the query; and
  in response to generating the attention output;
  adjust the direction of emission of the light-emitting device relative to the computing device such that the light-emitting device emits light onto or adjacent the at least one region of the scene that includes the subject of the processing operation performed by the artificial intelligence system; and
  provide a plurality of focus indicators for display, wherein the plurality of focus indicators indicate outer bounds of the subject, and wherein the plurality of focus indicators comprise a plurality of emitted laser beams.

12. The device of claim 11, wherein the elongated, cylindrical body comprises a first portion and a second portion, and wherein the second portion is moveable relative to the first portion to switch between a permissible collection mode and a prohibited collection mode; and
  wherein the operations further comprise:
    obtain data descriptive of a movement of the second portion of the elongated, cylindrical body; and
    switch from a prohibited collection mode to a permissible collection mode.

13. The device of claim 11, wherein the elongated, cylindrical body comprises two cylindrical portions of different diameters.

14. The device of claim 11, wherein the elongated, cylindrical body is an outer shell.

15. The device of claim 11, further comprising:
  a docking device configured to be coupled with the elongated, cylindrical body by folding the docking device around the elongated, cylindrical body.

16. A computer-implemented method, the method comprising:
  obtaining, by a computing system comprising one or more processors, a query from a user;
  obtaining, by the computing system, an image of a scene captured by a camera of a computing device, wherein the scene comprises a plurality of objects;
  generating, by an artificial intelligence system and based on the query and the image of the scene captured by the camera, an attention output that describes at least one region of the scene that includes a subject of a processing operation performed by the artificial intelligence system, wherein the artificial intelligence system comprises one or more machine-learned models, wherein the attention output indicates that the subject is responsive to the query, wherein the subject comprises an object of the plurality of objects selected based on the query; and
  in response to generating the attention output;
  adjusting, by the computing system, a direction of emission of a light-emitting device relative to the computing device such that the light-emitting device emits light onto or adjacent the at least one region of the scene that includes the subject of the processing operation performed by the artificial intelligence system; and
  provide a plurality of focus indicators for display, wherein the plurality of focus indicators indicate outer bounds of the subject, and wherein the plurality of focus indicators comprise a plurality of emitted laser beams.

17. The method of claim 16, further comprising:
  determining, by the computing system, a confidence value associated with the attention output; and
  displaying, by the computing system, a confidence graphic on a screen that graphically describes the confidence value, wherein the confidence graphic comprises at least one of a shape density, a color combination, or a shape movement characteristic that describes the confidence value output by the machine-learned model.

18. The method of claim 16, wherein the query comprises a question; and wherein the attention output answers that question.

19. The method of claim 16, wherein obtaining the query from the user comprises:
  obtaining, by the computing system, a plurality of face images of a face of the user;
  processing, by the computing system, the plurality of face images with the artificial intelligence system to determine a query based on lip movements of the user.

* * * * *